United States Patent
Lee et al.

(10) Patent No.: US 10,462,021 B2
(45) Date of Patent: Oct. 29, 2019

(54) SYSTEM AND METHOD FOR PROVIDING OBJECT VIA WHICH SERVICE IS USED

(71) Applicant: SAMSUNG ELECTRONICS CO., LTD., Suwon-si (KR)

(72) Inventors: Jae-Young Lee, Hwaseong-si (KR); Jong-hyun Ryu, Daejeon (KR); Yong-gook Park, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 232 days.

(21) Appl. No.: 14/174,429

(22) Filed: Feb. 6, 2014

(65) Prior Publication Data
US 2014/0222986 A1   Aug. 7, 2014

(30) Foreign Application Priority Data

Feb. 6, 2013   (KR) .................. 10-2013-0013489
Jul. 19, 2013   (KR) .................. 10-2013-0085681

(51) Int. Cl.
| G06F 15/173 | (2006.01) |
| H04L 12/24 | (2006.01) |
| G06F 9/54 | (2006.01) |

(52) U.S. Cl.
CPC ............... *H04L 41/50* (2013.01); *G06F 9/54* (2013.01); *G06F 9/541* (2013.01)

(58) Field of Classification Search
CPC .............................. G06Q 30/02; G01S 19/14
See application file for complete search history.

(56) References Cited

U.S. PATENT DOCUMENTS

| 7,899,269 B2 | 3/2011 | Kuwata |
| 7,925,973 B2 * | 4/2011 | Allaire ............... G06Q 30/0239 |
| | | 715/201 |

(Continued)

FOREIGN PATENT DOCUMENTS

| CN | 102714709 A | 10/2012 |
| CN | 102724303 A | 10/2012 |

(Continued)

OTHER PUBLICATIONS

International Search Report dated May 26, 2014, issued by the International Searching Authority in counterpart International Application No. PCT/KR2014/000946.

(Continued)

*Primary Examiner* — Umar Cheema
*Assistant Examiner* — Tesfu N Mekonen
(74) *Attorney, Agent, or Firm* — Sughrue Mion, PLLC

(57) ABSTRACT

Provided are a system and method for providing an object via which a service is used. A server for providing at least one device with an object via which a service provided by a service provider is used includes: a template providing unit configured to provide the service provider with a first template which is used in generating the object, wherein the object is not installed in the device but is displayed on a screen of the device via a host program of the device; a template receiving unit configured to receive, from the service provider, a second template that is generated by the service provider by editing the first template; a template storing unit configured to store the received second template; and an object generating unit configured to generate, using the stored second template, the object via which the service provided by the service provider is used.

28 Claims, 22 Drawing Sheets

(56) References Cited

U.S. PATENT DOCUMENTS

| | | | |
|---|---|---|---|
| 8,572,132 B2* | 10/2013 | Lewin | G06F 17/30902 |
| | | | 707/803 |
| 8,752,111 B2* | 6/2014 | Roberts | H04L 12/4625 |
| | | | 725/114 |
| 9,099,151 B2* | 8/2015 | Miura | H04N 5/765 |
| 2007/0038931 A1 | 2/2007 | Allaire et al. | |
| 2008/0120154 A1 | 5/2008 | Dellovo | |
| 2009/0089225 A1 | 4/2009 | Baier et al. | |
| 2009/0158179 A1 | 6/2009 | Brooks | |
| 2010/0306075 A1* | 12/2010 | Drance | G06Q 30/02 |
| | | | 705/26.7 |
| 2011/0166918 A1 | 7/2011 | Allaire et al. | |
| 2011/0179445 A1* | 7/2011 | Brown | G06Q 30/02 |
| | | | 725/32 |
| 2012/0021774 A1* | 1/2012 | Mehta | G06Q 30/0282 |
| | | | 455/456.3 |
| 2012/0101903 A1* | 4/2012 | Oh | G06Q 30/0269 |
| | | | 705/14.66 |
| 2012/0131612 A1* | 5/2012 | Liu | H04N 21/2541 |
| | | | 725/39 |
| 2012/0158513 A1* | 6/2012 | Schoen | G06Q 30/0269 |
| | | | 705/14.66 |
| 2012/0185772 A1* | 7/2012 | Kotelly | G11B 27/34 |
| | | | 715/719 |
| 2012/0284365 A1 | 11/2012 | Ma et al. | |
| 2013/0080526 A1 | 3/2013 | Gill et al. | |
| 2013/0166580 A1* | 6/2013 | Maharajh | H04L 65/605 |
| | | | 707/758 |
| 2014/0195345 A1* | 7/2014 | Lyren | G06Q 30/0271 |
| | | | 705/14.53 |
| 2014/0222613 A1* | 8/2014 | Ryu | G06Q 20/145 |
| | | | 705/26.7 |

FOREIGN PATENT DOCUMENTS

| | | | | |
|---|---|---|---|---|
| CN | 102834840 A | | 12/2012 | |
| RU | 2423020 C1 | | 6/2011 | |
| WO | 2011/159469 A2 | | 12/2011 | |
| WO | WO 2014123337 A1 * | | 8/2014 | G06F 9/54 |

OTHER PUBLICATIONS

Written Opinion dated May 26, 2014, issued by the International Searching Authority in counterpart International Application No. PCT/KR2014/000946.

Communication dated Nov. 16, 2016, issued by the Russian Patent Office in counterpart Russian application No. 2015137874/08.

Communication dated Jan. 31, 2018, issued by the State Intellectual Property Office of P.R. China in counterpart Chinese Patent Application No. 201410190502.5.

Communication dated Oct. 12, 2018, issued by the State Intellectual Property Office of People's Republic of China in counterpart Chinese Application No. 201410190502.5.

Communication dated Apr. 12, 2019, issued by the State Intellectual Property Office of People's Republic of China in counterpart Chinese Application No. 201410190502.5.

* cited by examiner

FIG. 12

| FIRST TEMPLATE | SERVICE TYPE | CONTEXT MODEL |
|---|---|---|
| AA | MORNING DRAMA | aa |
| BB | MORNING DRAMA | bb |
| CC | MORNING DRAMA | cc |

FIG. 13

| FIRST TEMPLATE | SERVICE TYPE | WEEKDAY MORNING | HOUSEWIFE | TV |
|---|---|---|---|---|
| AA | MORNING DRAMA A | ○ | ○ | ○ |
| BB | MORNING DRAMA B | ○ | | ○ |
| CC | PICTURE SHARING SERVICE A | ○ | ○ | |

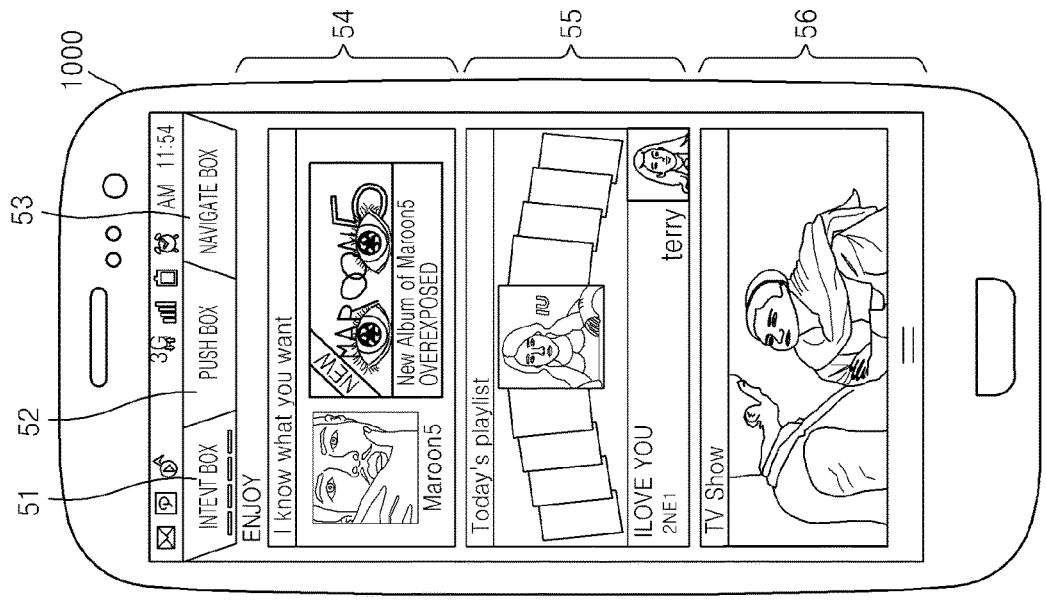
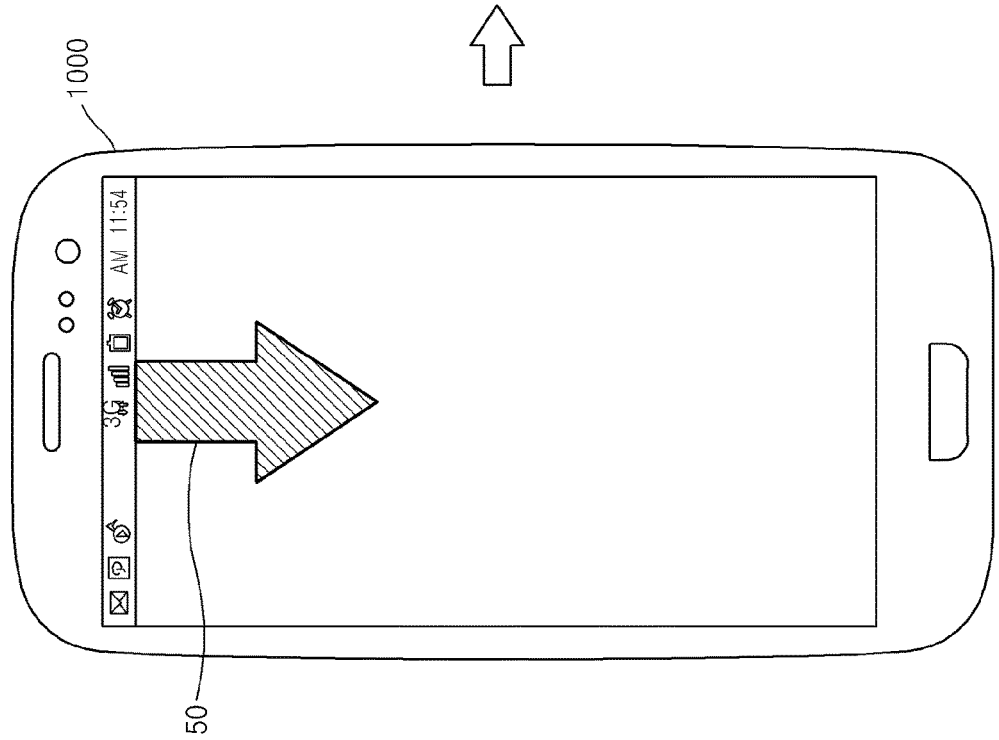
FIG. 15A
FIG. 15B

FIG. 26

| CLASSIFICATION | CLASSIFICATION | VALUES |
|---|---|---|
| STREAMING INFORMATION | GPS | LATITUDE, LONGITUDE |
| | Accelerometer | x, y, z ACCELERATION VALUES |
| | Proximity | WHETHER THERE IS OBJECT IN PROXIMITY OF PHONE |
| | Illuminometer | LUMINANCE OF SURROUNDING ILLUMINATION |
| | Magnetic | MAGNETIC INTENSITY AND MAGNETIC AZIMUTH |
| | Orientation | x, y, z ACCELERATION OF GRAVITY |
| | Battery | RESIDUAL BATTERY CAPACITY |
| | WiFi | AP, WiFi IP, SIGNAL INTENSITY |
| | Bluetooth | BLUETOOTH ID, SIGNAL INTENSITY |
| | MIC. | LOUDNESS |
| EVENT INFORMATION | Phone Profile | BELL SOUND, VIBRATION, MUTE, AIRPLATE MODE |
| | Calendar | REGISTERED SCHEDULE |
| | E-Mail | RECEIVED/SENT MAIL |
| | SMS | RECEIVED/SENT MESSAGE |
| | Call | RECEIVED/SENT TELEPHONE CALL |
| | Alarm | REGISTERED ALARM |
| | Application | APPLICATION PROGRAMS AND USED FUNCTIONS |
| WEB SERVICE INFORMATION | BROADCAST SERVICE | WATCHED BROADCASTING PROGRAM |
| | MUSIC SERVICE | DOWNLOADED MUSIC |
| | WEATHER SERVICE | WEATHER INFORMATION |
| | TRANSPORTATION SERVICE | TRANSPORTATION INFORMATION |
| | PICTURE SHARING SERVICE | SHARED PICTURES |

SYSTEM AND METHOD FOR PROVIDING OBJECT VIA WHICH SERVICE IS USED

RELATED APPLICATIONS

This application claims priority from Korean Patent Application No. 10-2013-0013489, filed on Feb. 6, 2013, and Korean Patent Application No. 10-2013-0085681, filed on Jul. 19, 2013, in the Korean Intellectual Property Office, the disclosures of which are incorporated herein in their entirety by reference.

BACKGROUND

1. Field

Methods and apparatuses consistent with exemplary embodiments relate to providing an object, whereby an object regarding a service to be provided to a device is generated using a template that is edited by a service provider.

2. Description of the Related Art

With the advance in device performance and network technology, a user is able to receive various services through a device of the user from various service providers. However, diversification of service providers and types of services provided by service providers makes it difficult to search for adequate services for a user. Moreover, it is difficult for a service provider to effectively collect information about a target user who is going to efficiently use a service provided by the service provider.

Accordingly, a technique for providing a user interface via which services of a service provider may be effectively recommended to a user so that the user may use desired services effectively on a device of the user is required. Furthermore, a service provider may have to provide a user with a user interface with which the user may effectively use services of the service provider.

SUMMARY

One or more exemplary embodiments provide a system and method for providing an object, whereby an object regarding a service to be provided to a device may be generated using a template edited by a service provider.

One or more exemplary embodiments provide a system and method for providing an object, whereby an editing tool for editing a template included in an object via which a service is used may be provided to a service provider.

One or more exemplary embodiments provide a system and method for providing an object, whereby a context item and a service of a service provider may be matched with a template using an editing tool.

One or more exemplary embodiments provide a system and method for providing an object, whereby information about a context item and a service of a service provider may be loaded using an application program interface (API) included in an editing tool.

Additional aspects will be set forth in part in the description which follows and, in part, will be apparent from the description, or may be learned by practice of the presented embodiments.

According to an aspect of an exemplary embodiment, there is provided a server for providing at least one device with an object via which a service provided by a service provider is used, the server including: a template providing unit configured to provide the service provider with a first template which is used in generating the object, wherein the object is not installed in the device but is displayed on a screen of the device via a host program of the device; a template receiving unit configured to receive, from the service provider, a second template that is generated by the service provider by editing the first template; a template storing unit configured to store the received second template; and an object generating unit configured to generate, using the stored second template, the object via which the service provided by the service provider is used.

The server may further include an object providing unit configured to provide the object to the device according to a current situation of the device.

The template providing unit may be configured to provide the service provider with at least one context model related to use of the service, and the second template may match with a context model selected by the service provider from among the provided at least one context model and with the service of the service provider.

The object providing unit may be configured to provide the device with the object including the second template that matches with a context model related to the current situation of the device.

The object generating unit may be configured to insert information about a reason why the object is provided, into the second template.

The template providing unit may be configured to provide the service provider with at least one context model related to use of the service, wherein the context model includes a plurality of context items and types of services that match with the plurality of context items.

At least one of the plurality of context items, selected by the service provider, may be matched with the second template by the service provider.

The template providing unit may be configured to provide the service provider with an editing tool used in editing the first template, wherein the editing tool is used by the service provider in editing the first template.

The editing tool may be used by the service provider in inserting information about the service of the service provider into the first template.

The editing tool may be used by the service provided in selecting a context item and a service that are to be matched with the second template.

The editing tool may be displayed on a display of the service provider via a user interface including an area for selecting the context item, an area for selecting the service, and an area for inserting information about the service.

The editing tool may include a context application program interface (API), wherein the context API is used by the service provider in loading a context model related to use of the service, from the server.

The editing tool may include a service application program interface (API), wherein the service API is used by the service provider in loading information about a service of the service provider.

The object may include a user interface comprising an icon, text, an image, and link information of content provided through the service, and description information about a function of the object.

According to an aspect of another exemplary embodiment, there is provided a method of providing an object via which a service provided by a service provider is used by a server, to at least one device, wherein the method is performed by a server, the method including: providing, to the service provider, a first template which is used in generating the object that is not installed in the at least one device but is displayed on a screen of the at least one device via a host program of the at least one device; receiving, from the service provider, a second template that is generated by the service provider by editing the first template; and generating an object via which a service of the service provider is used, using the received second template.

The method may further include providing the at least one device with the object, according to a current situation of the at least one device.

The method may further include providing at least one context model related to use of the service, to the service provider, and the second template may match with a context model selected by the service provider from among the at least one provided context model and with the service of the service provider.

In the providing the object, the at least one device may be provided with the object including the second template that matches with a context model related to the current situation of the at least one device.

In the generating the object, information about a reason why the object is provided may be inserted into the second template.

The method may further include providing the service provider with at least one context model related to use of the service, and the context model may include a plurality of context items and types of services that match with the plurality of context items.

At least one of the plurality of context items, selected by the service provider, may be matched with the second template by the service provider.

The method may further include providing an editing tool used in editing the first template, to the service provider, and the editing tool may be used by the service provider in editing the first template.

The editing tool may be used by the service provider in inserting information about the service of the service provider into the first template.

The editing tool may be used by the service provider in selecting a context item and a service that are to be matched with the second template.

The object may include a user interface including an icon, text, an image, and link information of content provided through the service, and description information about a function of the object.

According to an aspect of another exemplary embodiment, there is provided a method of providing, to a server, a template used by a service provider in generating an object for providing a service of the service provider, the method including: receiving, from the server, a first template which is used in generating the object that is not installed in a device but is displayed on a screen of the device via a host program of the device; generating a second template by editing the first template; and providing the server with the generated second template, wherein the second template is used by the server in generating the object.

The second template may be matched with a context item included in a content model received from the server and with a service of the service provider.

The method may further include receiving, from the server, an editing tool for editing the first template, wherein in the generating the second template, the first template is edited using the editing tool.

In the generating the second template, the context item may be matched with the second template using the editing tool.

In the generating the second template, a service of the service provider may be matched with the second template using the editing tool.

In the generating the second template, service information about the service provider may be inserted into the first template using the first editing tool.

According to an aspect of another exemplary embodiment, there is provided a non-transitory computer-readable medium storing a program causing a computer to execute a method of providing an object via which a service provided by a service provider is used by a server, to at least one device, wherein the method is performed by a server, the method including: providing, to the service provider, a first template which is used in generating the object that is not installed in the at least one device but is displayed on a screen of the at least one device via a host program of the at least one device; receiving, from the service provider, a second template that is generated by the service provider by editing the first template; and generating an object via which a service of the service provider is used, using the received second template.

According to an aspect of another exemplary embodiment, there is provided a non-transitory computer-readable medium storing a program causing a computer to execute a method of providing, to a server, a template used by a service provider in generating an object for providing a service of the service provider, the method including: receiving, from the server, a first template which is used in generating the object that is not installed in a device but is displayed on a screen of the device via a host program of the device; generating a second template by editing the first template; and providing the server with the generated second template, wherein the second template is used by the server in generating the object.

BRIEF DESCRIPTION OF THE DRAWINGS

The above and/or other aspects will become apparent and more readily appreciated from the following description of exemplary embodiments, taken in conjunction with the accompanying drawings in which:

FIG. 12 is a table showing values that are matched with a first template, according to an exemplary embodiment;

FIG. 13 is a diagram showing a value matched with a second template, according to an exemplary embodiment;

FIGS. 15A and 15B illustrate an example in which an object via which a service is used is displayed on a device, according to an exemplary embodiment;

FIG. 26 illustrates a table showing a portion of a piece of context information that is collected by a device and a cloud server and is classified according to an exemplary embodiment.

DETAILED DESCRIPTION

Figure 1:
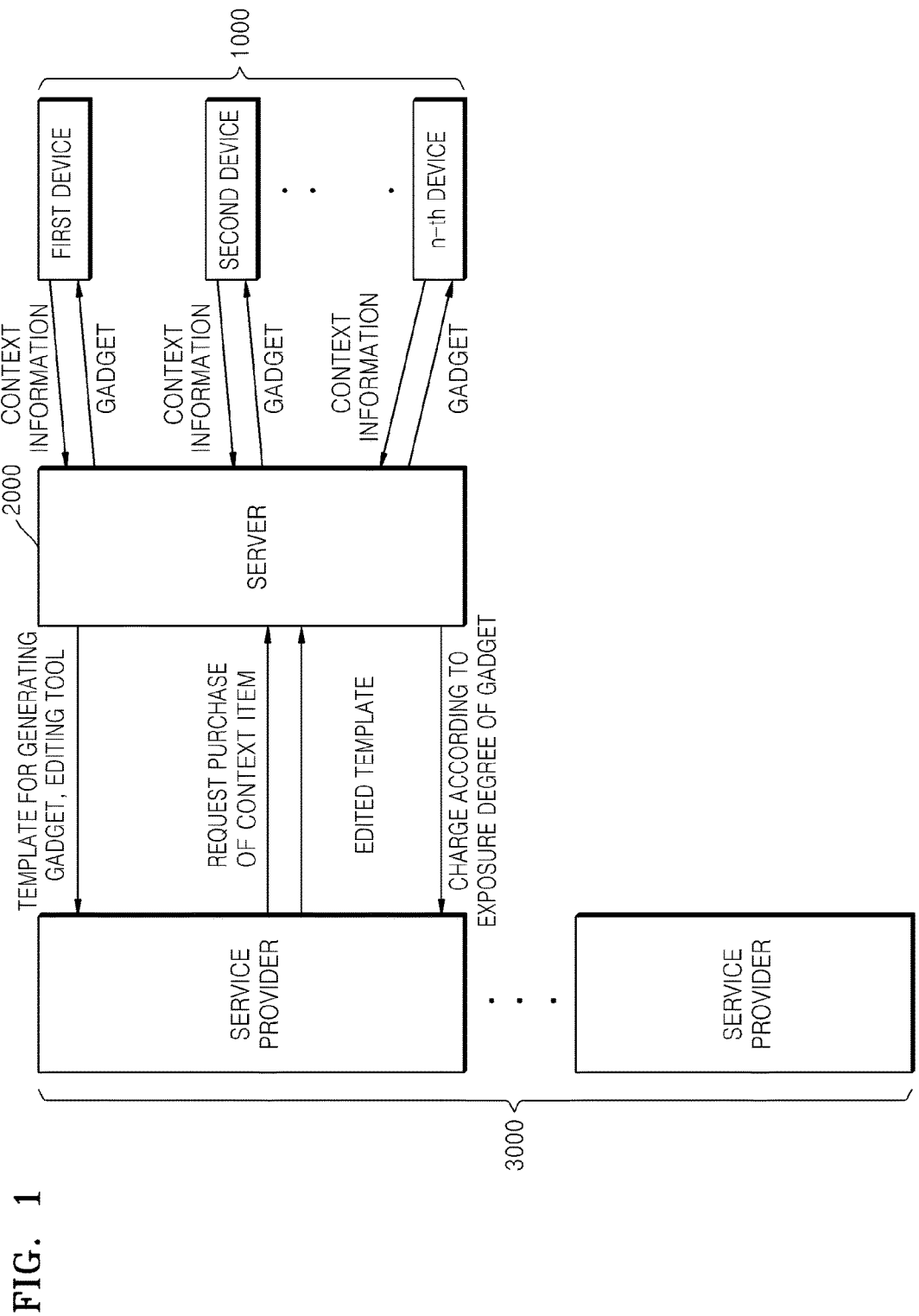
FIG. 1 is an outline diagram of a system for providing an object via which a service is used, according to an exemplary embodiment.

The attached drawings illustrating exemplary embodiments are referred to in order to gain a sufficient understanding of the exemplary embodiments, the merits thereof, and objectives that may or may not be accomplished by the exemplary embodiments. Hereinafter, the exemplary embodiments will be described in detail with reference to the attached drawings. Like reference numerals in the drawings denote like elements.

In the present specification, when a constituent element "connects" or is "connected" to another constituent element, the constituent element contacts or is connected to the other constituent element not only directly but also electrically through at least another constituent element interposed therebetween. Also, when a part may "include" a certain constituent element, unless specified otherwise, it may not be construed to exclude another constituent element but may be construed to further include other constituent elements.

Also, in the present specification, an object via which a service is used refers to a user interface via which a service of a service provider is used. An object via which a service is used may be a user interface via which a service provided by a server or a content provider is provided. Examples of an object via which a service is used may include a user interface including an icon, text, an image, and link information and description of a function of the object.

Also, a device may receive an object from a server, and may use a service of a service provider using the received object based on a user input to the object. A device may obtain content from an application program in the device, data sources, a server, and a content provider, and process the content, using the object. Also, an object may be a user interface in which predetermined services provided based on context information of a user (or a device) are packaged.

Also, an object may not be installed in a device or executed by a device but may be interpreted via a host program of the device to be displayed on a screen of the device or used by a user. An object may be, for example, a gadget, but is not limited thereto. Also, an object may not be installed in a device or executed by a device but may be displayed as an additional window on a device screen by a host program of the device.

Also, in the present specification, context information refers to information about a situation in which a device has used a service. Also, in regard to use of a service, context information may include any information that may identify a situation of an environment, an object, or a state of a relevant user (or device) between the user (or the device) and a computing environment. A device may use various types of services under various situations, and context information about a service use situation of the device may be collected via a server.

Also, a context item in the present specification refers to a specific item included in context information, and may include, for example, a user who has used a service, a type of a device that has used a service, a service use time, a service use location, other users who have also used a service, or an application executed in a device, but is not limited thereto.

Also, in the present specification, a context model refers to a model obtained by matching at least one context item with a predetermined service type. For example, a morning drama broadcast service may be matched with at least one context item such as a user who has used a service, a type of a device that has used a service, a service use time, a service use location, other users who have also used a service, and an application executed in a device.

In the present specification, a service includes all types of services that are provided to a device by a service provider. Examples of the service include a broadcast service, a content sharing service, a content providing service, a power management service, a game providing service, a chatting service, a document composing service, a search service, a telephone call service, a photographing service, a transportation recommendation service, a personal safety service, a friend recommendation service, and a video replay service, but are not limited thereto. Also, a service provider may be a server or a device that provides a service.

Hereinafter, the present invention will be described in detail with reference to the attached drawings.

FIG. 1 is an outline diagram of a system for providing an object via which a service is used, according to an exemplary embodiment.

As illustrated in FIG. 1, the system for providing an object via which a service is used includes at least one device 1000, a server 2000, and at least one service provider 3000.

In the system for providing an object of FIG. 1, the server 2000 collects context information regarding service use from the device 1000, and provides the service provider 3000 with context information, a template used in generating an object, and an editing tool. Also, the service provider 3000 edits the template received from the server 2000, and requests the server 2000 to purchase a predetermined context item. Also, the server 2000 generates an object using an edited template, and provides the device 1000, which is in the same or similar situation as a predetermined context item, with the generated object. Also, the server 2000 calculates a charge amount to the service provider 3000 according to the provided object.

In detail, the device 1000 provides the server 2000 with context information related to a service use. Examples of context information may include context items such as a service type, a user who has used a service, a type of a device that has used a service, a service use time, a service use location, other users who have also used a service, and an application executed in a device.

Also, the device 1000 receives, from the server 2000, an object via which a service recommended according to a condition of the device 1000 is received. Also, the device 1000 may use a service of the service provider 3000 using the received object.

The device 1000 may be a smartphone, a mobile phone, a personal digital assistant (PDA), a laptop computer, a media player, a global positioning system (GPS) device, and other mobile or non-mobile computing devices. Also, the device 1000 may be a wearable device. For example, the device 1000 may be a watch, glasses, a hair band, or a ring having a communication function and a data processing function. However, the exemplary embodiments are not limited thereto, and the device 1000 may include all types of devices that are capable of receiving an object from the server 2000 via a network and executing the object.

The server 2000 receives context information regarding service use from the device 1000 and models the received context information. The server 2000 may recommend at least one context item regarding a predetermined service type. Also, the server 2000 may match a recommended context item with a service type, thereby generating a predetermined context model. A portion of context information may be provided to the service provider 3000. Alternatively, a context model or a context item may be provided to the service provider 3000.

Also, the server 2000 may provide the service provider 3000 with a template for generating an object and an editing tool, and may receive a template edited by the service provider 3000 from the service provider 3000, and may generate an object to be provided to the device 1000. In this case, a template received from the service provider 3000 may be matched with a predetermined context item and a predetermined service.

Also, the server 2000 provides the device 1000 with the generated object. The server 2000 may monitor a situation of the device 1000, and provide the device 1000 that is in a predetermined situation, with a predetermined object. Also, the server 2000 may calculate a charge amount to be charged to the service provider 3000, according to a predetermined charging method.

The service provider 3000 may edit a template using an editing tool received from the server 2000. The service provider 3000 may match a predetermined context model, a predetermined context item, and a predetermined service, with a template. In this case, the service provider 3000 may request the server 2000 to purchase the matched context item. Also, the service provider 3000 may insert service information about the matched service, into a template.

Thus, a service that is matched by the service provider 3000 may be provided to the device 1000 that is in the same or similar situation as that of the context item matched by the service provider 3000.

Figure 2:
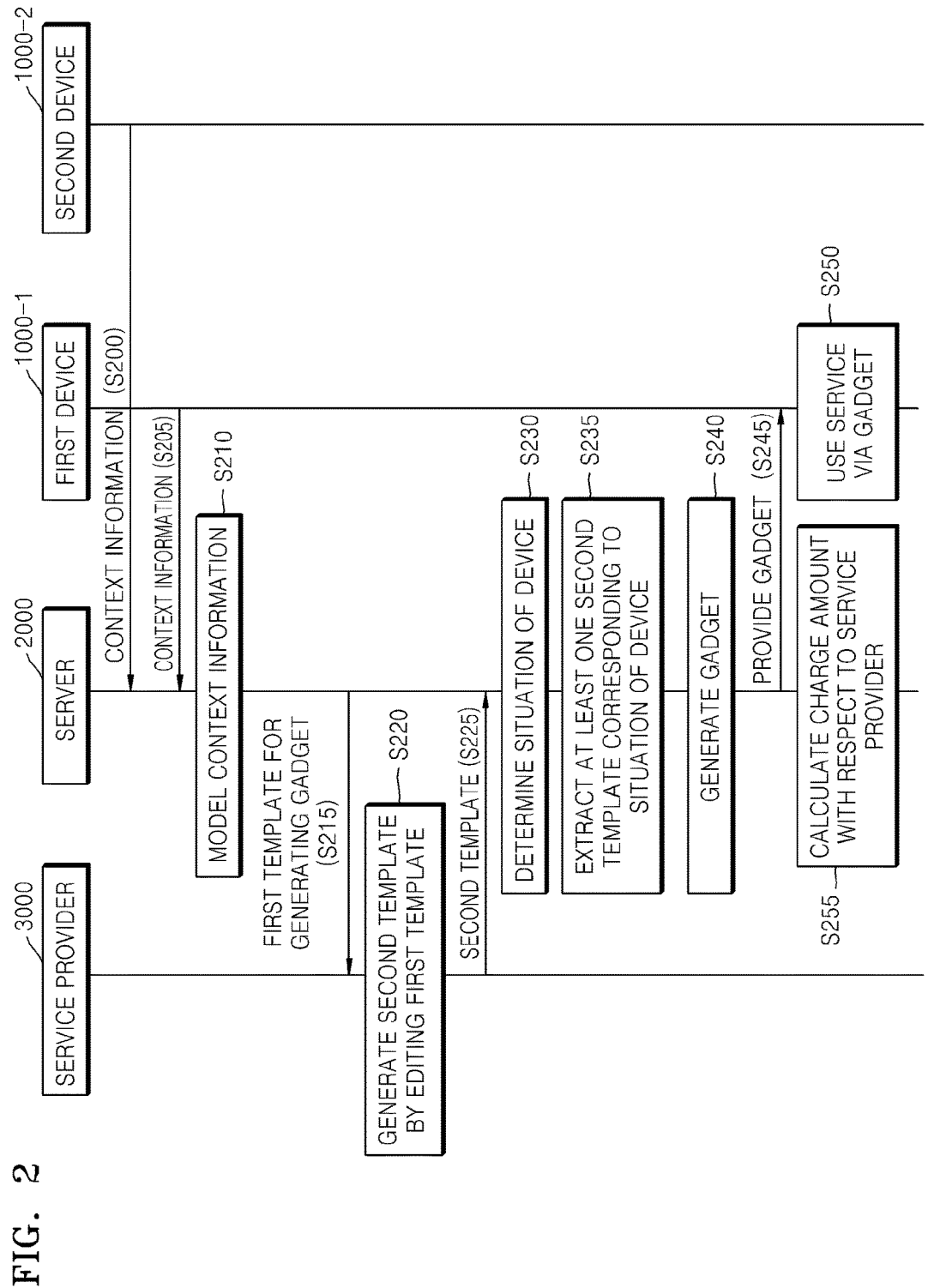
FIG. 2 is a flowchart illustrating a method of providing an object via which a service is used, according to an exemplary embodiment.

FIG. 2 is a flowchart illustrating a method of providing an object via which a service is used, according to an exemplary embodiment.

The server 2000 receives context information from a second device 1000-2 in operation S200, and receives context information from a first device 1000-1 in operation S205. The server 2000 may receive context information to generate a context model as described later. Also, the server 2000 may receive context information to determine a current situation of the first device 1000-1 and a current situation of the second device 1000-2.

Context information refers to information about a situation in which a device has used a service. The device 1000 may use various types of services under various situations, and context information about a service use situation of the device 1000 may be collected by the server 2000. Also, a context item refers to a specific item included in context information, and may include, for example, a user who has used a service, a type of a device that has used a service, a service use time, a service use location, other users who have also used a service, and an application executed in a device, but is not limited thereto.

Also, context information may include any information that may identify a situation of an environment, an object, or a state of a user (or the device 1000) between the user (or the device 1000) and a computing environment. Also, the context information may be abstracted by the server 2000 and may be classified into various types according to a degree of abstraction.

Also, context information may include sensor data collected by a sensor included in the device 1000, data about an application program operating in the device 1000 by a user input, and data related to a cloud server that the device 1000 has used.

Also, as illustrated in FIG. 26, the collected data may include, for example, streaming data, event information, and web service (cloud computing) information.

Streaming information is information that is collected in real time and may include, for example, sensor data collected by the device 1000 in real time. Also, event information refers to information generated when an event is generated, and may include, for example, data about a set up change of the device 1000. Also, web service information is information about use of a web service and may include information about various contents that the device 1000 has used by accessing various web resources (e.g., a cloud server). Web service information may include a vast amount of information provided by the web resources, and thus may be updated using a cloud computing method.

In operation S210, the server 2000 generates a context model by modeling context information. The server 2000 may model context information by recommending context items according to service types. The server 2000 may recommend, with respect to a predetermined service, at least one of a user who has used a service, a type of a device that has used a service, a service use time, a service use location, other users who have also used a service, and an application executed in a device. For example, if a housewife frequently watches morning dramas on TV on weekday mornings, the server 2000 may recommend a context item such as 'weekday morning,' housewife; and 'TV' in regard to a 'morning drama broadcast service.'

Also, the server 2000 may generate a context model by matching a service type with the recommended context item. For example, the server 2000 may match a 'morning drama broadcast service' with 'weekday morning,' 'housewife'; and 'TV' to thereby generate a context model. A context model may be used by the service provider 3000 to determine which context item to match with a service of the service provider 3000.

In operation S210, the server 2000 may model context information using a predetermined context engine (not shown). The server 2000 may generate a context model by inferring the collected context information using various methods. The server 2000 may model context information using at least one of, for example, an ontology-based method and a probability-based method.

Also, the server 2000 may store context information by classifying the same as dynamic information and static information, and may abstract at least a portion of context information according to a predetermined rule. Examples of context information include concrete context information, basis context information, and abstract context information. Concrete context information refers to non-processed data and may be data that is collected using the sensor included in the device 1000, an application program, or via a cloud server. Concrete context information may include, for example, GPS latitude/longitude values or a WiFi service set identifier (SSID). Also, information included in a table of FIG. 19 may be concrete context information. Also, basis context information may be a context that is identified using statistical data by analyzing concrete context information that is collected for a predetermined period of time. Also, abstract context information may be information derived from concrete context information and basis context information. Abstract context information may be dependent upon a domain. For example, "Samsung Coex Mall" is identified as a location of the device 1000 based on a GPS value (37.511238, 127.059602) and it is determined that the identified location is similar to a location listed in a user's event schedule. And it is determined that a standstill state of the device 1000 is maintained for a predetermined period of time due to an analysis of the GPS and accelerometer of the device 1000. A Bluetooth ID of a participant's device registered in the event schedule of the user may be recognized. In this case, it may be inferred that a corresponding situation is "I wish not to be disturbed."

Also, the server 2000 may generate a context model by distinguishing a context item and matching the context item with a predetermined service, using concrete context information, basis context information, and abstract context information.

In operation S215, the server 2000 provides the service provider 3000 with a first template for generating an object. The first template may include a plurality of areas such as an area for inserting a description of a service, an area for inserting an image related to a service, and an area for inserting a menu and an icon via which a service is used, but is not limited thereto. Also, the server 2000 may determine a structure of a template for generating an object in advance according to a service type and a context model.

Also, the first template may also be determined in advance according to a user or the device 1000. The server 2000 may previously determine first templates to be provided to the device 1000 of a user according to the user's preference and may provide the service provider 3000 with the determined first templates.

Also, the server 2000 may provide first the service provider 3000 with an editing tool as described later. An editing tool may be used in editing a first template. In this case, when the service provider 3000 selects a predetermined context model or a predetermined service type using an editing tool, the server 2000 may provide a template corresponding to the selected context model or the selected service type as a first template. The service provider 3000 may receive at least one context model using an editing tool, and may select at least one of the received context models. Also, as the service provider 3000 selects a context model, the editing tool may load the first template corresponding to the selected context model from the server 2000.

Also, the first template provided to the service provider 3000 will be described in detail later with reference to FIG. 9.

In operation S220, the service provider 3000 edits the first template to generate a second template. The service provider 3000 may edit the first template using an editing tool provided by the server 2000. Also, an editing tool may be displayed on a display device (not shown) included in the service provider 3000 via a user interface including at least one of an area for selecting a context model, an area for selecting a context item, an area for selecting a service of the service provider 3000, and an area for inserting information about a service of the service provider 3000.

The service provider 3000 may match a service thereof with the first template using the editing tool. For example, when the service provider 3000 selects an area for selecting a service, which is included in a user interface of the editing tool, the editing tool may load a service list of the service provider 3000, which is stored in a database (DB) of the service provider 3000. Also, by selecting one of the items of the loaded service list, the service provider 3000 may match a selected service with the first template. In this specification, the first template that is edited by the service provider 3000 is referred to as a second template, and consequently, matching a selected service with the first template may be interpreted as matching the selected service with the second template.

Also, the service provider 3000 may match a context item with the first template, using an editing tool. For example, when the service provider 3000 selects an area for selecting a context item, included in the user interface of the editing tool, the editing tool may load at least one context item from the DB (not shown) of the server 2000. Also, the service provider 3000 may match the selected context item with the first template by selecting one of the loaded context items.

Also, the service provider 3000 may insert service information related to the selected service into the first template, using an editing tool. Service information refers to information about services of the service provider 3000, and may include, for example, a service title, a link address for downloading content related to a service, an image related to a service, text related to a service, and activity information for providing a service, but is not limited thereto. An activity for providing a service refers to an operation of providing a service based on a user input regarding the second template (the edited first template), and may include, for example, an operation of transmitting or receiving predetermined data or displaying a lower rank template according to a touch input of the user, with respect to the second template.

In operation S225, the service provider 3000 provides the server 2000 with the second template. The service provider 3000 may request the server 2000 to purchase a context item included in the second template while providing the server 2000 with the second template. In this case, the service provider 3000 may provide the server 2000 with information about a charging method together with the purchase request.

The charging method may include at least one of an auction method, a group purchase method, an exclusive purchase method, a method in which an amount is charged according to a degree that an object is exposed, and a method of charging an amount according to use of a service via an object, but is not limited thereto.

Also, the second template provided to the server 2000 may be stored in the DB (not shown) of the server 2000.

Though the service provider 3000 described above requests the server 2000 to purchase a context item while providing the server 2000 with the second template, the exemplary embodiments are not limited thereto. In operation S220, when the service provider 3000 edits the first template, the service provider 3000 may select a context item and may request the server 2000 to purchase the selected context item.

In operation S230, the server 2000 determines a current situation of the device 1000. The server 2000 may monitor, for example, a user of the device 1000, a type of the device 100, a location of the device 1000, a current time, a weekday, or an application being executed on the device 1000, but is not limited thereto.

In operation S235, the server 2000 extracts at least one second template corresponding to the monitored current situation of the device 1000, from the DB (not shown). The server 2000 may compare the current situation with a context item included in the second template. Also, the server 2000 may extract the second template including a context item corresponding to the monitored current situation of the device 1000, from the DB (not shown). For example, if a housewife turns on a TV on a weekday morning, the server 2000 may extract the second template that is matched with context items such as "housewife," "weekday morning," and "TV" from the DB (not shown).

In operation S240, using the second template, the server 2000 generates an object via which a service is used. The server 2000 may generate or select information about a basis for recommending to the device 1000 an object via which a service of the service provider 3000 is used, and may insert the generated recommendation ground into the object.

For example, the server 2000 may insert, into the second template, recommendation reasons such as "pictures taken in the past with friends with whom you are meeting today," "pictures taken with people with whom you had a telephone conversation an hour ago," "recommending friends who are near you," "recommending friends who have listened to the music you are now listening to," "recommending music you listened to often in the past but have not listened to recently," and "pictures you took a year ago today."

Also, the server 2000 may generate an object by combining a template received from the service provider 3000 and a template received from at least another service provider (not shown). However, if the service provider 3000 has purchased a context item using an exclusive purchase method, the server 2000 may not include a template of another service provider (not shown) in the object.

In operation S245, the server 2000 provides the first device 1000-1 with an object. The server 2000 may compare a context item that the service provider 3000 has purchased with the current situation of the device 1000, and may provide the device 1000 with the object based on a comparison result. When the context item that the service provider 3000 has purchased is the same or similar as the current situation of the first device 1000-1, the server 2000 may provide the first device 1000-1 with an object for using a service of the service provider 3000.

In operation S250, the first device 1000-1 uses a service provided by the service provider 3000, using the received object. The object includes link information via which data related to a service provided by the service provider 3000 is received, and the first device 1000-1 may receive a service from the service provider 3000 using the link information included in the object.

Also, the first device 1000-1 may provide the server 2000 with an object and information about use of a service. The first device 1000-1 may provide the server 2000 with, for example, the number of times executing an object, the number of times using a service of the service provider 3000 via an object, the number of times purchasing predetermined data, items or products using a service of the service provider 3000, and information about a purchase cost.

As described above, the service provider 3000 may generate a second template by editing the first template. Also, as the second template is matched with a predetermined context item and a predetermined service, if a situation of the device 1000 corresponds to the context item matched with the second template, the object including the second template may be provided to the device 1000.

In operation S255, the server 2000 calculates a charge amount regarding the service provider 3000. The server 2000 may calculate a charge amount to be charged to the service provider 3000 based on information on the number of times that an object of the service provider 3000 is executed by the device 1000, the number of times that the device 1000 has used a service using the object of the service provider 3000, and a service charge to the device 1000 which has used the object for using a service of the service provider 3000.

Figure 3:
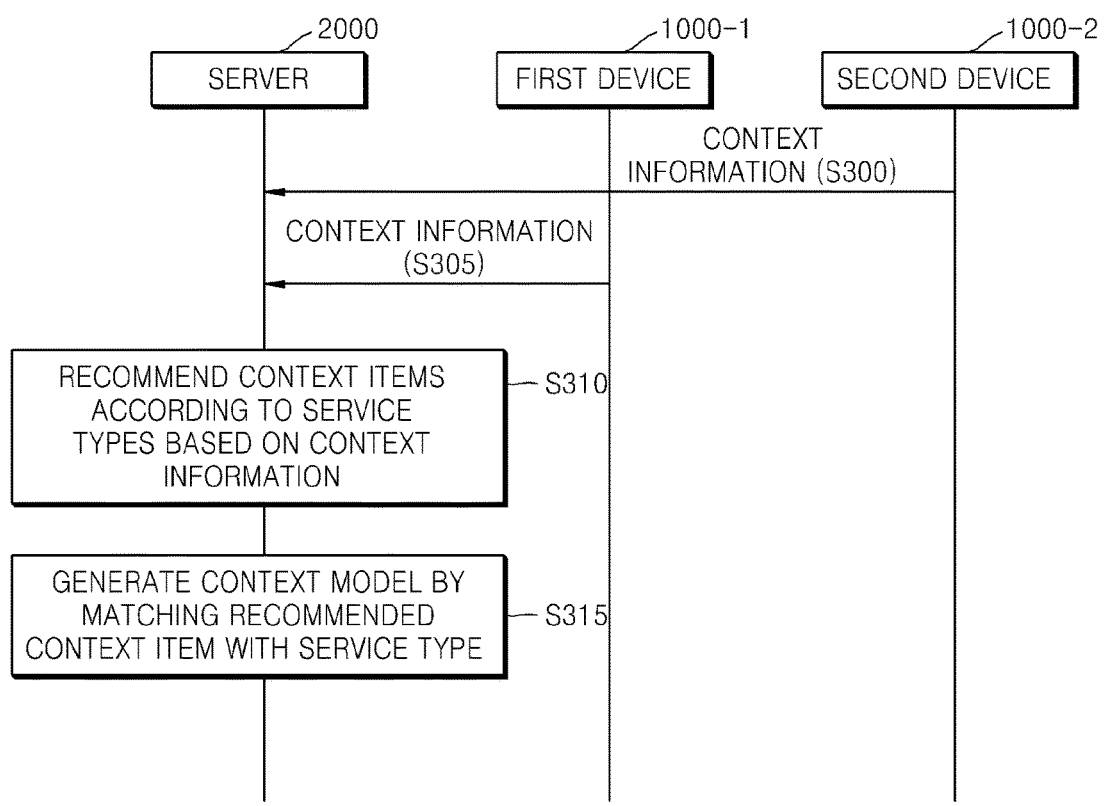
FIG. 3 is a flowchart illustrating a method of modeling context information on a server, according to an exemplary embodiment.

FIG. 3 is a flowchart illustrating a method of modeling context information on the server 2000, according to an exemplary embodiment.

In operation S300, the server 2000 receives context information from a second device 1000-2, and in operation S305, the server 2000 receives context information from a first device 1000-1. Context information refers to information about a situation in which the device 1000 has used a service. The device 1000 may use various types of services under various situations, and context information about a service use situation of the device 1000 may be collected by the server 2000. Also, a context item refers to a specific item included in context information, and may include, for example, a user who has used a service, a type of a device that has used a service, a service use time, a service use location, other users who have also used a service, or an application executed in a device, but is not limited thereto.

In operation S310, the server 2000 recommends a context item according to types of services, based on context information. The server 2000 may determine a situation under which a service is used more than a preset number of times, and may recommend at least one context item based on a frequent use situation. The server 2000 may recommend, with respect to a predetermined service, at least one of, for example, a user who has used a service, a type of a device that has used a service, a service use time, a service use location, other users who have also used a service, or an application executed in a device. For example, if the number of times housewives have watched morning dramas on TV is more than a preset number, the server 2000 may recommend context items such as 'weekday morning,' 'housewife,' and 'TV' with respect to a 'morning drama broadcast service.' Also, for example, if a user is at school, and the number of times that the user has shared pictures taken at school is more than a preset frequency, the server 2000 may recommend context items such as 'school,' friends; and 'now,' with respect to a 'picture sharing service.' Also, if the number of times workers have used a taxi nearby their homes is more than a preset frequency, the server 2000 may recommend context items such as 'weekday morning,' worker; and 'near home' with respect to a 'taxi recommendation service.'

In operation S315, the server 2000 may generate a context model by matching recommended context items with service types. The server 2000 may generate a context model by matching at least one of the recommended context items with a service type.

For example, the server 2000 may generate a context model by matching a 'morning drama broadcast service' with at least one of 'weekday morning,' housewife; and 'TV.' Also, for example, the server 2000 may generate a context model by matching a 'picture sharing service' with 'school,' friends; and 'now.' Also, for example, the server 2000 may generate a context model by matching a 'taxi recommendation service' with 'weekday morning,' worker; and 'near home.'

Also, information about the generated context model may be provided to the service provider 3000, and the service provider 3000 may use a context model to determine which service to match with which context item.

Figure 4:
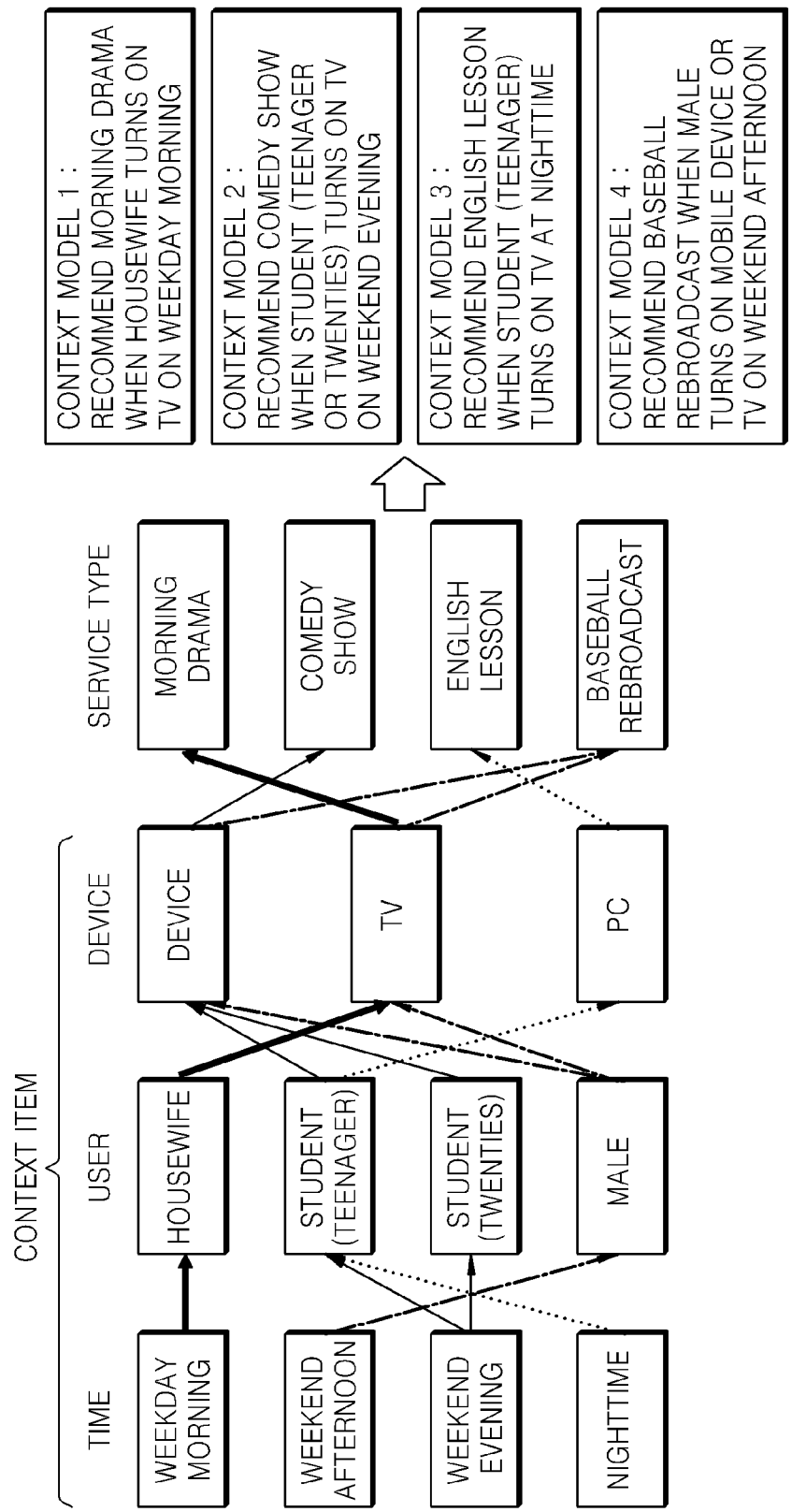
FIG. 4 is a diagram illustrating a context model generated with respect to a broadcast service, according to an exemplary embodiment.

FIG. 4 is a diagram illustrating a context model generated with respect to a broadcast service, according to an exemplary embodiment.

Referring to FIG. 4, a context item may include an item about a service use time, an item about a user who has used a service, and an item about a device that has used a service. Also, a context item about a service use time may include, for example, 'weekday morning,' 'weekend afternoon,' 'weekend evening,' and 'night time.' Also, a context item about a user who has used a service may include, for example, 'housewife,' 'student (teenager),' 'student (twenties),' and 'male.' Also, a context item about a device that has used a service may include, for example, 'mobile device,' 'TV,' and 'PC.'

Also, examples of a service type regarding a broadcast service may include 'morning drama,' 'comedy show,' 'English lesson,' and 'baseball rebroadcast.'

Also, the server 2000 may determine a situation where a service has been used more than a preset frequency, and may recommend a context item for the service. For example, the server 2000 may recommend 'weekday morning,' 'housewife,' and 'TV' for a 'morning drama.' Also, for example, the server 2000 may recommend 'weekend evening,' 'student (teenagers and twenties),' and 'mobile device' for a 'comedy show.'

Also, the server 2000 may match at least one of 'weekday morning,' 'housewife,' and 'TV' with a 'morning drama' to generate Context model 1. Also, the server 2000 may match at least one of 'weekend evening,' 'student (teenagers and twenties),' and 'mobile device' with a 'comedy show' to generate Context model 2.

Figure 5:
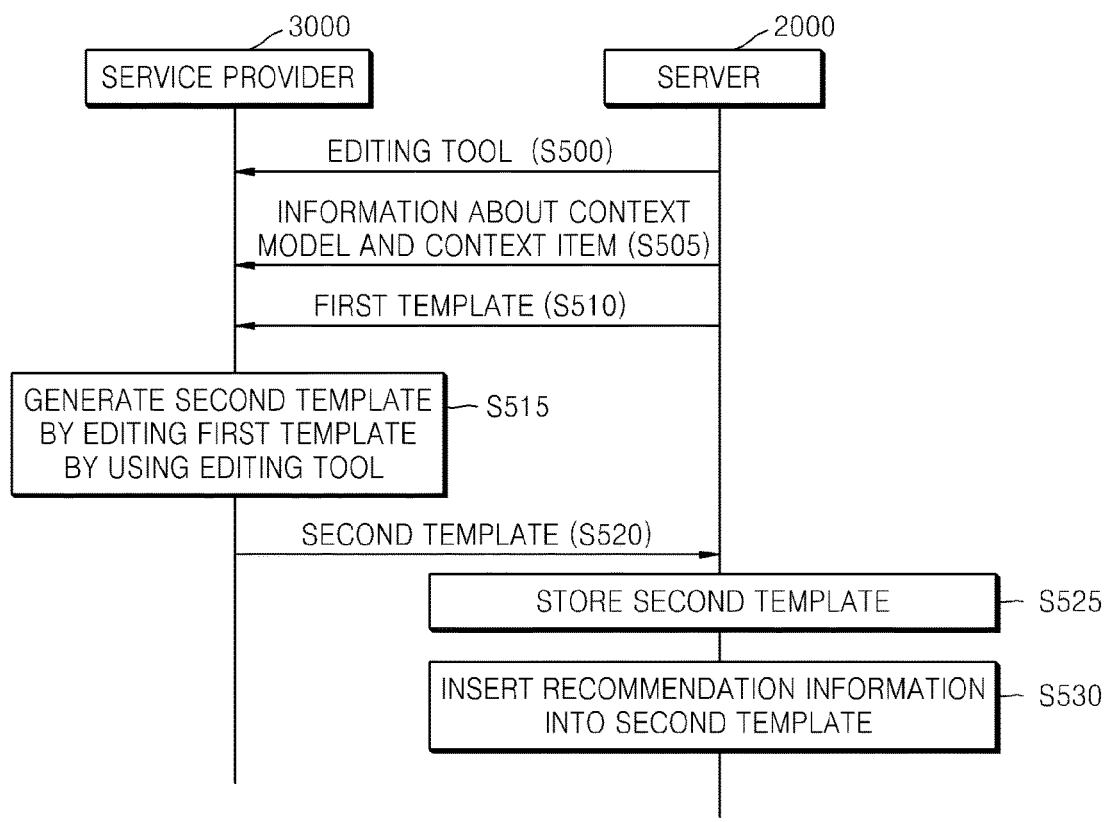
FIG. 5 is a flowchart illustrating a method of generating an object via which a service is used, on a server, according to an exemplary embodiment.

FIG. 5 is a flowchart illustrating a method of generating an object via which a service is used, on a server 2000, according to an exemplary embodiment. In FIG. 5, the service provider 3000 may download an editing tool and generate a second template using the downloaded editing tool, and the server 2000 may generate an object using the second template.

In operation S500, the server 2000 provides the service provider 3000 with an editing tool. The server 2000 may provide the service provider 3000 with a file of an editing tool or a link address for downloading an editing tool. An editing tool may be displayed on a display device (not shown) included in the service provider 3000 via a user interface including at least one of, for example, an area for selecting a context model, an area for selecting a context item, an area for selecting a service of the service provider 3000, and an area for inserting information about a service of the service provider 3000. Also, an editing tool may include a plurality of application program interfaces (APIs) used in editing the first template. An editing tool may include an API for selecting a context model, an API for selecting a context item, an API for selecting a service of the service provider 3000, an API for inserting service information of the service provider 3000 into the first template, and an API for modifying an external appearance of the first template, but is not limited thereto.

In operation S505, the server 2000 provides the service provider 3000 with information about a context model and a context item. When the service provider 3000 selects a model selection area included in a user interface of an editing tool, the editing tool may load information about a context model from a DB (not shown) of the server 2000. In this case, the server 2000 may provide the service provider 3000 with information about a context model related to a service of the service provider 3000.

Also, when the service provider 3000 selects an area for selecting a context item included in the user interface of the editing tool, the editing tool may load a context item from the DB (not shown) of the server 2000. In this case, the server 2000 may recommend a context item included in the context model selected by the service provider 3000 to the service provider 3000 but embodiments of the present invention are not limited thereto. Regardless of the context model selected by the service provider 300, the server 2000 may also provide the service provider 3000 with a predetermined context item stored in the DB (not shown).

In operation S510, the server 2000 provides the service provider 3000 with the first template. When the service provider 3000 selects a context model, the server 2000 may provide the service provider 3000 with a first template according to a service type corresponding to the context model. Also, when the service provider 3000 selects a predetermined service type, the server 2000 may provide the service provider 3000 with the first template according to the selected service type. In this case, the first template may be generated in advance according to a service type and stored in the server 2000.

In operation S515, the service provider 3000 generates a second template by editing the first template using an editing tool. The service provider 3000 may match a context item with the first template using the editing tool. For example, at least one context item may be displayed on an area for selecting a context item included in a user interface of the editing tool. Also, the service provider 3000 may select one of displayed context items to match a selected context item with the first template.

Also, using an editing tool, the service provider 3000 may match a service thereof with the first template. For example, when the service provider 3000 selects a service selection area included in a user interface of the editing tool, the editing tool may load a service list of the service provider 3000 that is stored in the DB (not shown) of the service provider 3000. Also, by selecting a service of the loaded service list, the service provider 3000 may match the selected service with the first template.

Also, the service provider 3000 may insert service information related to the selected service, into the first template using an editing tool. Service information is information about services of the service provider 3000 and may include, for example, a service title, a link address for downloading content related to a service, an image related to a service, text related to a service, and activity information for providing a service, but is not limited thereto. An activity for providing a service refers to an operation of providing a service based on a user input regarding the first template, and may include, for example, an operation of transmitting or receiving predetermined data or displaying a lower rank template according to a touch input of the user, with respect to the first template.

In operation S520, the service provider 3000 provides the server 2000 with the second template. The service provider 3000 may request the server 2000 to purchase a context item while providing the server 2000 with the second template. However, the exemplary embodiments are not limited thereto, and when the service provider 3000 edits the first template in operation S515, the service provider 3000 may select a context item and request the server 2000 to purchase the selected context item.

In operation S525, the server 2000 stores the second template. The server 2000 may store the second template received from the service provider 3000, in the DB (not shown) of the server 2000. The server 2000 may match the second template with a service type, an identification value of the service provider 3000, an identification value of a service of the service provider 3000, and a context item, and store the same.

In operation S530, the server 2000 inserts recommendation information into the second template. Recommendation information refers to information about a basis for recommending the second template to the device 1000. Recommendation information may be generated based on a context item and a service that are matched with the second template. For example, if context items matched with the second template are 'housewife,' 'weekday morning,' and 'TV,' and a service matched with the second template is 'morning drama AA,' the server 2000 may insert a recommendation reason such as 'TV dramas that you would like to watch on weekday mornings' into the second template. Also, the server 2000 may complete an object via which a service is used, using the second template into which a recommendation reason is inserted.

Also, for example, the server 2000 may generate or select a recommendation reason based on a date when a content provided by a service is generated, time and location, a user's use history of content, and a relationship between a user of content and a user of the device 1000. In this case, the date when the content is generated and the time and location may be obtained from metadata. Also, the relationship between the user of the content and the user of the device 1000 may be identified based on relationship information stored on a social network service (SNS) server, a message transmission history between users, or a content sharing history between users, but is not limited thereto.

Figure 6:
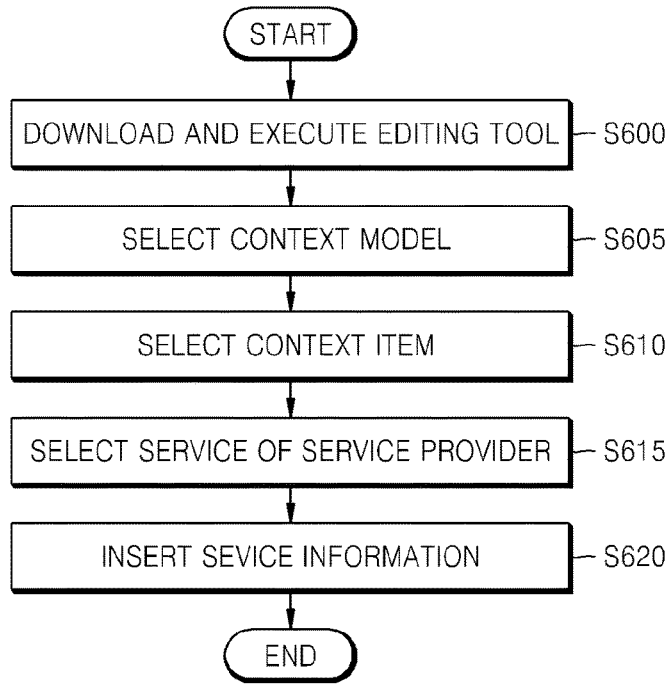
FIG. 6 is a flowchart illustrating a method of generating a second template on a service provider, according to an exemplary embodiment.

FIG. 6 is a flowchart illustrating a method of generating a second template, on a service provider 3000, according to an exemplary embodiment. In FIG. 6, the service provider 3000 downloads an editing tool, and may generate a second template using the downloaded editing tool.

In operation S600, the service provider 3000 downloads an editing tool and executes the same. The service provider 3000 may download an editing tool from the server 2000 or receive information about a link via which an editing tool may be downloaded, from the server 2000. Also, the executed editing tool may be displayed on a display device (not shown) of the service provider 3000 via a user interface including at least one of an area for selecting a context model, an area for selecting a context item, an area for selecting a service of the service provider 3000, and an area for inserting information about a service of the service provider 3000.

In operation S605, the service provider 3000 selects a context model. On the editing tool, a list of context models may be displayed on an area for selecting a context model. The list of context models may be provided by the server 2000 based on types of services provided by the service provider 3000. For example, when the service provider 3000 provides a broadcast service, the server 2000 may provide the service provider 3000 with a list of context models with respect to a broadcast service.

Also, when the service provider 3000 selects one context model from the list of context models, the server 2000 may provide information about the selected context model and a first template that is matched with the selected context model to the service provider 3000.

In operation S610, the service provider 3000 selects a context item. A list including at least one context item related to the selected context model may be displayed on the editing tool in an area for selecting a context item. Also, when the service provider 3000 selects at least one context item, the selected context item may be matched with the edited first template (the second template). Accordingly, an object including the second template may be provided to the device 1000 that is under a condition corresponding to the selected context item. For example, when the service provider 3000 selects 'housewife' and 'weekday morning' from among 'housewife,' 'weekday morning,' and 'TV,' an object including the second template may be provided to the device 1000 owned by a housewife on a weekday morning.

In operation S615, the service provider 3000 selects a service to be provided through the edited first template (the second template). In an area for selecting a service of an editing tool, a list of services of the service provider 3000 may be displayed, and the service provider 3000 may select a predetermined service from the displayed service list.

In operation S620, the service provider 3000 inserts service information into the first template using an editing tool. Service information is information about services of the service provider 3000 and may include, for example, a service title, a link address for downloading content provided through a service, an image related to a service, text related to a service, and activity information for providing a service, but is not limited thereto. An activity for providing a service refers to an operation of providing a service based on a user input regarding the second template (the edited first template), and may include, for example, an operation of transmitting or receiving predetermined data or displaying a lower rank template according to a touch input of the user, with respect to the second template.

Figure 7:
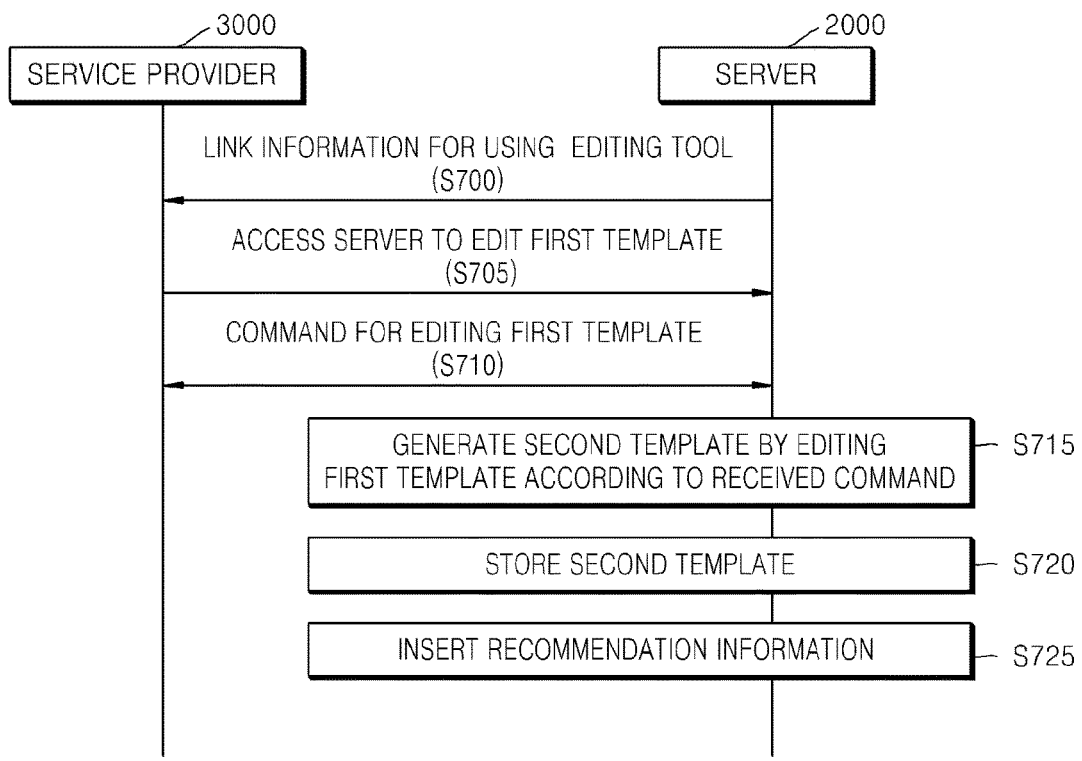
FIG. 7 is a flowchart illustrating a method of generating an object via which a service is used, on a server, according to another exemplary embodiment.

FIG. 7 is a flowchart illustrating a method of generating an object via which a service is used, on the server 2000, according to another exemplary embodiment. In FIG. 7, the service provider 3000 may use an editing tool by accessing the server 2000, and the server 2000 may generate a second template based on an editing command transmitted from the service provider 3000 and generate an object.

In operation S700, the server 2000 provides link information via which an editing tool is used. Link information may be an access address of a web server via which an editing tool may be used. Also, the web server may be the server 2000 or an external server (not shown). Hereinafter, an embodiment in which the server 2000 is the web server will be described.

In operation S705, the service provider 3000 accesses the server 2000 to edit the first template. The service provider 3000 may access the server 2000 that provides an editing tool, using the link information received in operation S700. Also, the service provider 3000 may use an editing tool executed on the server 2000.

In operation S710, the service provider 3000 transmits a command for editing a first template, to the server 2000. Using the editing tool executed on the server 2000, the service provider 3000 may provide the server 2000 with a command for editing a first template. A command for editing a first template may be a predetermined control command, but is not limited thereto. A command for a first template may be a predetermined input signal.

The service provider 3000 may provide the server 2000 with a command for selecting a context model, a command for selecting a context item, and a command for selecting a service. Also, the service provider 3000 may provide the server 2000 with service information to be inserted into a first template, and provide the server 2000 with a command for inserting service information into the first template. Service information refers to information about services of the service provider 3000, and may include, for example, a service title, a link address for downloading content related to a service, an image related to a service, text related to a service, and activity information for providing a service, but is not limited thereto. An activity for providing a service refers to an operation of providing a service based on a user input regarding a first template, and may include, for example, an operation of transmitting or receiving predetermined data or displaying a lower rank template according to a touch input of the user, with respect to the first template.

In operation S715, the server 2000 may generate a second template by editing the first template according to a received command. The server 2000 may select a predetermined context model and display the first template related to the selected context model on a user interface of an editing tool based on a command for selecting a context model. Also, the server 2000 may display a context item on a user interface of an editing tool. Also, the server 2000 may match a context item with the first template based on a command for selecting a context item.

Also, the server 2000 may select a service of the service provider 3000 and insert service information about the selected service into the first template based on a command for selecting a service.

In operation S720, the server 2000 stores a second template (the edited first template). The server 2000 may also store the second template received from the service provider 3000 in the DB (not shown) of the server 2000. The server 2000 may match the second template with a service type, an identification value of the service provider 3000, an identification value of the service provider 3000, and a context item.

In operation S725, the server 2000 inserts recommendation information into the second template. Recommendation information refers to information about grounds for recommending the second template to the device 1000. Recommendation information may be generated based on a context item matched with the second template. For example, if context items matched with the second template are 'housewife,' 'weekday morning,' and 'TV,' and a service matched with the second template is 'morning drama AA,' the server 2000 may insert recommendation reason information such as 'TV dramas that you would like to watch on weekday mornings' into the second template. Also, the server 2000 may complete an object via which a service is used, using the second template into which a recommendation ground is inserted.

Figure 8:
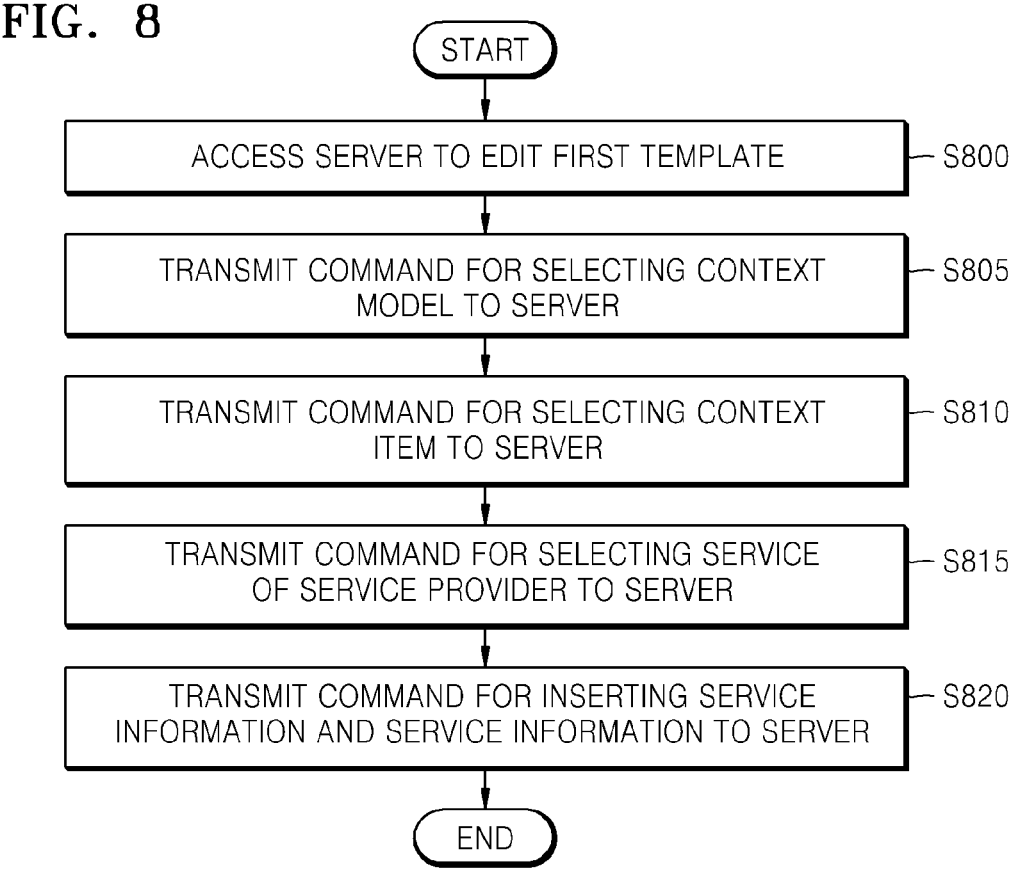
FIG. 8 is a flowchart illustrating a method of providing a server with a command for generating a second template, on a service provider, according to another exemplary embodiment.

FIG. 8 is a flowchart illustrating a method of providing the server 2000 with a command for generating a second template, on the service provider 3000, according to another exemplary embodiment. In FIG. 8, the service provider 3000 may use an editing tool by accessing the server 2000, and may provide the server 2000 with a command for editing a first template.

In operation S800, the service provider 3000 accesses the server 2000 to edit the first template. The service provider 3000 may access the server 2000 via which an editing tool is provided, via link information received from the server 2000.

In operation S805, the service provider 3000 transmits a command for selecting a context model, to the server 2000. As the service provider 3000 accesses the server 2000 to use an editing tool, a user interface of the editing tool may be displayed on a display device (not shown) of the service provider 3000. Also, the server 2000 may display a list of context models on the user interface of the editing tool, and the service provider 3000 may provide the server 2000 with an input signal for selecting a predetermined context model from the list of context models. Accordingly, the server 2000 may display a first template related to a selected context model, on the user interface of the editing tool, and may display the list of context items related to the selected context model, on the user interface of the editing tool. However, the exemplary embodiments are not limited thereto, and regardless of the selected context model, the server 2000 may also display a list of context items on the user interface of the editing tool.

In operation S810, the service provider 3000 transmits a selection command of a context item to the server 2000. The service provider 3000 may also provide the server 2000 with an input signal for selecting at least one context item from the list of context items. Also, the server 2000 may select a predetermined context item and match the selected context item with the first template, based on an input signal for selecting a context item.

In operation S815, the service provider 3000 transmits a command for selecting a service of the service provider 3000, to the server 2000. When the service provider 3000 provides the server 2000 with an input signal for selecting a service selection area on the user interface of the editing tool and transmits a service list of the service provider 3000 to the server 2000, the server 2000 may display a list of services of the service provider 3000 on the user interface of the editing tool.

Also, when the service provider 3000 provides the server 2000 with an input signal for selecting a predetermined service from the list of services, the server 2000 may select a predetermined service and match the selected service with the first template.

In operation S820, the service provider 3000 transmits a command for inserting service information into the first template, and service information to the server 2000. The service provider 3000 may select a predetermined area included in the first template, using the editing tool, and insert predetermined service information into the selected area. The first template may include a plurality of areas such as an area for inserting a description of a service, an area for inserting an image related to a service, and an area for inserting a menu and an icon via which a service is used, but is not limited thereto. Also, the service information may include, for example, a service title, a link address for downloading content related to a service, an image related to a service, text related to a service, and activity information for providing a service, but is not limited thereto.

Figure 9A:
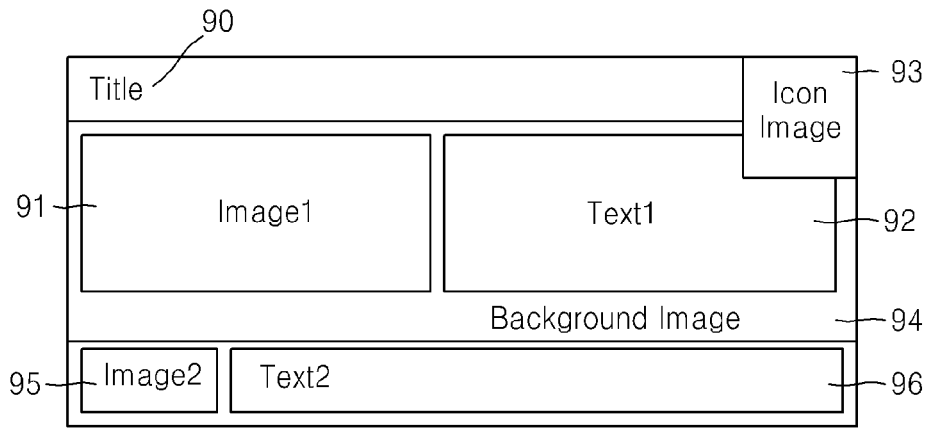
FIGS. 9A and 9B illustrate a first template according to an exemplary embodiment.
Figure 9B:
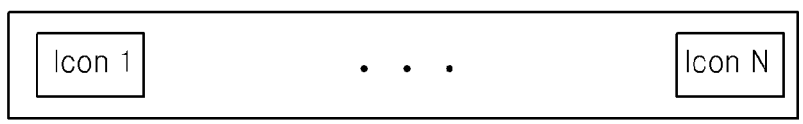

FIGS. 9A and 9B illustrate a first template according to an exemplary embodiment.

Referring to FIG. 9A, the first template according to the current exemplary embodiment may include an area 90 for inserting a service title, areas 91 and 95 for inserting an image related to a service, an area 92 for inserting a menu, via which a service is used, or description of a service, an area 93 for inserting an icon related to a service, and an area 94 for inserting a background image.

Also, the first template may include an area 96 for inserting a basis for recommending an object including the edited first template (the second template). A recommendation basis may be inserted into the area 96 via the server 2000. The server 2000 may receive the second template (the edited first template) from the service provider 3000 and may insert the recommendation basis into the second template. In this case, the recommendation basis may be inserted based on a context item and a service that are matched with the second template. For example, if context items matched with the second template are 'housewife,' 'weekday morning,' and 'TV,' and a service matched with the second template is 'morning drama AA,' the server 2000 may insert a recommendation basis such as 'TV dramas that you want to watch on weekday mornings' into the second template.

Also, the first template according to the current exemplary embodiment may include a lower rank template as illustrated in FIG. 9B. A lower rank template may be displayed when a predetermined area of the first template of FIG. 9A is touched, and may include activity information related to the provisioning of a service. For example, a lower rank template may include at least one icon for executing an operation related to the provisioning of a service.

Figure 10:
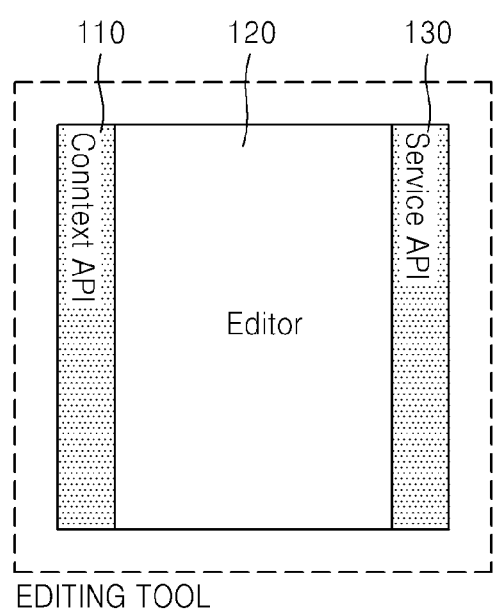
FIG. 10 is an internal structural diagram of an editing tool according to an exemplary embodiment.

FIG. 10 is an internal structural diagram illustrating an editing tool according to an exemplary embodiment.

Referring to FIG. 10, the editing tool according to the current exemplary embodiment may include a Context API 110, a Service API 130, and an Editor 120.

The Context API 110 loads context information from the DB (not shown) of the server 2000. The Context API 110 may load a list of context models related to the service provider 3000. Also, as the service provider 3000 selects a predetermined context model, the Context API 110 may load a context item related to the selected context model. However, the exemplary embodiments are not limited thereto, and the Context API 110 may also load a context item regardless of the selected context model.

The Service API 130 loads information about a service of the service provider 3000 from the DB (not shown) of the service provider 3000. The Service API 130 may load a list of services of the service provider 3000. Also, as the service provider 3000 selects a predetermined service, the Service API 130 may load information about the selected service.

The Editor 120 provides a function of editing the first template. The Editor 120 may insert an image, text, link information, and activity information into the first template to configure the first template.

Figure 11:
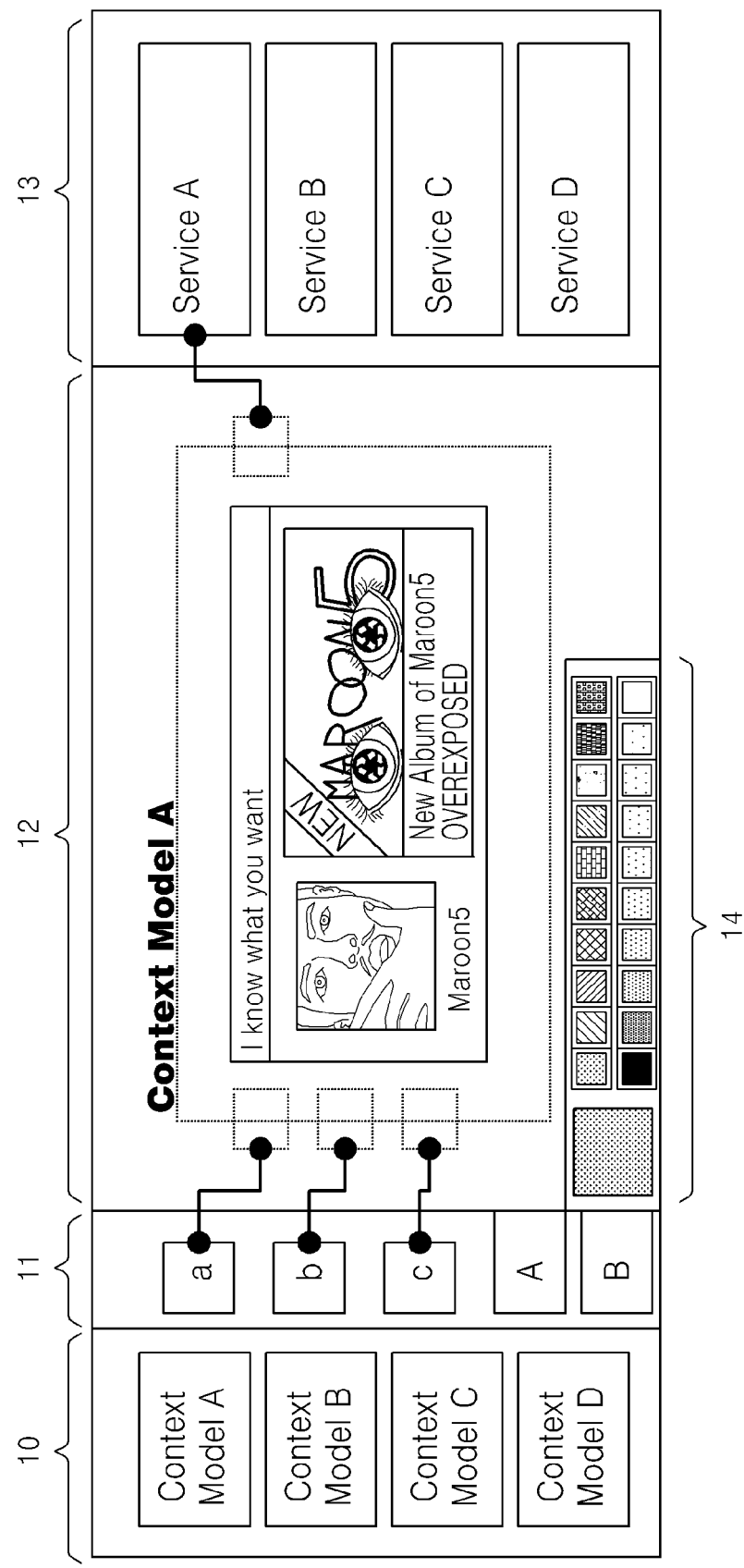
FIG. 11 illustrates an example of editing a first template using an editing tool, according to an exemplary embodiment.

FIG. 11 illustrates an example of editing a first template using an editing tool, according to an exemplary embodiment.

An editing tool may be displayed on a display device (not shown) of the service provider 3000 via a user interface, as illustrated in FIG. 10. Also, a user interface of an editing tool may include an area 10 for selecting a context model, an area 11 for selecting a context item, an area 12 for displaying a first template, an area 13 for selecting a service of the service provider 3000, and an area 14 for displaying a tool for decorating the first template.

In the area 10 for selecting a context model, a list of context models related to the service provider 3000 may be displayed. For example, in the area 10, "Context Model A," "Context Model B," "Context Model C," and "Context Model D" may be displayed, and the service provider 3000 may select "Context Model A."

Also, as the service provider 3000 selects "Context Model A," a first template regarding "Context Model A" may be displayed on the area 12.

Also, as the service provider 3000 selects "Context Model A," context items 'a,' 'b'; and 'c' included in "Context Model A," may be displayed. The context items 'a,' 'b'; and 'c' may be items that are recommended according to service types. However, the exemplary embodiments are not limited thereto, and context items 'A,' 'B'; and 'C' may be displayed on the area 11 regardless of "Context Model A."

Also, the service provider 3000 may click (or touch) at least one of the context items 'a,' 'b,' 'c,' 'A,' 'B'; and 'C' and drag the same to the area 12 to match the selected context item with the first template.

Also, a list of services of the service provider 3000 may be displayed on the area 13. In the area 13, for example, 'Service A,' 'Service B,' 'Service C,' and 'Service D' may be displayed. Also, the service provider 3000 may click (or touch) 'Service A' and drag the same to the area 12 to match 'Service A' with the first template.

Also, the first template may be displayed on the area 12, and the service provider 3000 may select a predetermined area of the first template and insert predetermined data into the selected area. Also, the service provider 3000 may decorate the first template using the tool displayed on the area 14.

FIG. 12 is a table illustrating values that are matched with a first template, according to an exemplary embodiment.

As illustrated in FIG. 12, the first template may be matched with at least one of a service type and a context model. Also, the first template may be generated by the server 2000 in advance according to at least one of a service type and a context model.

For example, the server 2000 may generate a first template 'AA' with respect to a 'morning drama' and a context model 'aa'; and a first template 'BB' with respect to a 'morning drama' and a context model 'bb.' Also, for example, the server 2000 may generate a first template 'CC' with respect to 'data sharing' and a context model 'cc.'

Accordingly, when the service provider 3000 provides a broadcast service, the server 2000 may provide the service provider 3000 with the context models 'aa' and 'bb' related to the broadcast service. Also, for example, when the service provider 3000 selects a context model 'aa'; the server 2000 may provide the service provider 3000 with the first template 'AA.'

FIG. 13 is a table illustrating values matched with a second template, according to an exemplary embodiment.

As illustrated in FIG. 13, the second template may be matched with a service of the service provider 3000, a service type, and at least one context item. In FIG. 12, the at least one context item may include 'weekday morning,' 'housewife,' and 'TV.'

For example, a template "AA" may be matched with "morning drama A," "weekday morning," "housewife," and "TV." In this case, when the TV of the housewife is turned on on a weekday morning, the server 2000 may provide the TV of the housewife with an object including a template "AA" that provides a 'morning drama A.'

Also, for example, a template "BB" may be matched with "morning drama B," "weekday morning," "housewife," and "TV.". In this case, when a TV is turned on on a weekday morning, the server 2000 may provide the TV with an object including the template "BB" that provides the "morning drama B."

Figure 14:
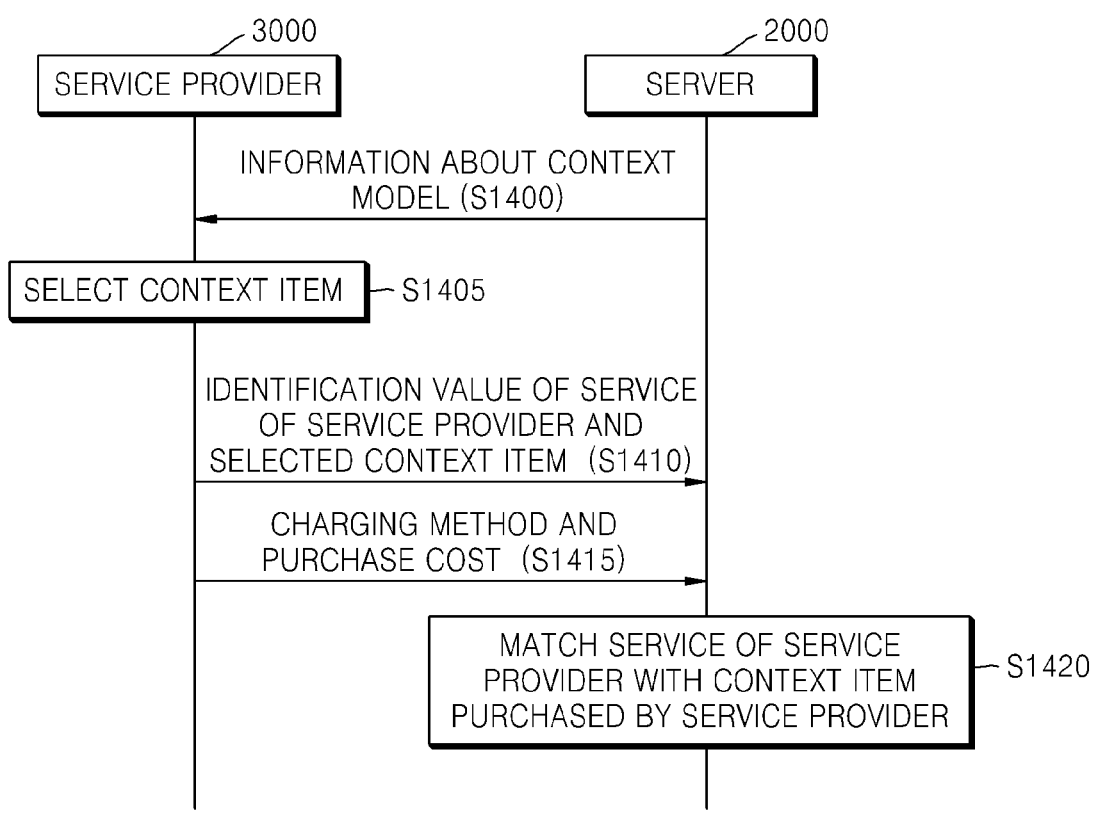
FIG. 14 is a flowchart illustrating a method of purchasing a context item on a service provider, according to an exemplary embodiment.

FIG. 14 is a flowchart illustrating a method of purchasing a context item on a service provider 3000, according to an exemplary embodiment.

In operation S1400, the server 2000 provides the service provider 3000 with information about a context model. Information about a context model may include information about matching between a service type and a context item recommended by the server 2000. Also, the server 2000 may determine a context model related to a service of the service provider 3000, and may provide the service provider 3000 with information about the determined context model. For example, if a service provided by the service provider 3000 is a broadcast service, the server 2000 may provide the service provider 3000 with at least one of a context model regarding a morning drama, a context model related to a comedy show, a context model related to an English lesson, and a context model about a baseball rebroadcast.

In operation S1405, the service provider 3000 selects a context item based on a context model. The service provider 3000 may receive a context model using an editing tool and select a context item.

In operation S1410, the service provider 3000 provides the server 2000 with an identification value of a selected service and a selected context item. Also, the service provider 3000 may request the server 2000 to purchase the selected context item with respect to the selected service.

The service provider 3000 may select a service and a context item of the service provider 3000 when editing the first template, and information about the selected service and the selected context item may be included in the edited first template. Also, by providing the edited first template to the server 2000, the service provider 3000 may provide the server 2000 with an identification value of the selected service and the selected context item. Also, the service provider 3000 may request the server 2000 to purchase the selected context item while providing the server 2000 with the edited first template.

In operation S1415, the service provider 3000 provides the server 2000 with information about a charging method and a purchase cost. The service provider 3000 may provide the server 2000 with information about a charging method and a purchase cost while providing the server 2000 with the edited first template.

Also, as a service of the service provider 3000 is provided to the device 1000 based on the context item purchased by the service provider 3000, the server 2000 may charge a predetermined amount to the service provider 3000. In this case, the server 2000 may calculate a charge amount to be charged to the service provider 3000, based on a charging method provided with the purchase request from the service provider 3000. The charging method may include at least one of an auction method, a group purchase method, an exclusive purchase method, a method in which an amount is charged according to a degree an object is exposed, and a method of charging an amount according to use of a service via an object, but is not limited thereto.

In operation S1420, the server 2000 matches a service of the service provider 3000 with a context item purchased by the service provider 3000. The server 2000 may confirm a purchase by the service provider 3000 with respect to the context item selected by the service provider 3000 and match the context item selected by the service provider 3000 with a service selected by the service provider 3000.

FIGS. 15A and 15B illustrate an example where an object via which a service is used is displayed on a device 1000, according to an exemplary embodiment.

As illustrated in FIG. 15A, a user may touch a bar 50 displayed on an upper portion of a screen of the device 100 and swipe the same downward. Also, as a user touches the bar 50 displayed on the upper portion of the screen and swipes the same downward, an object via which a service is used may be displayed on the screen of the device 1000 as illustrated in FIG. 15B.

Also, an object may include a plurality of menus 51, 52, and 53, and as the menu 51 is selected, a plurality of second templates 54, 55, and 56 related to the menu 51 may be displayed on the object.

Figure 16A:
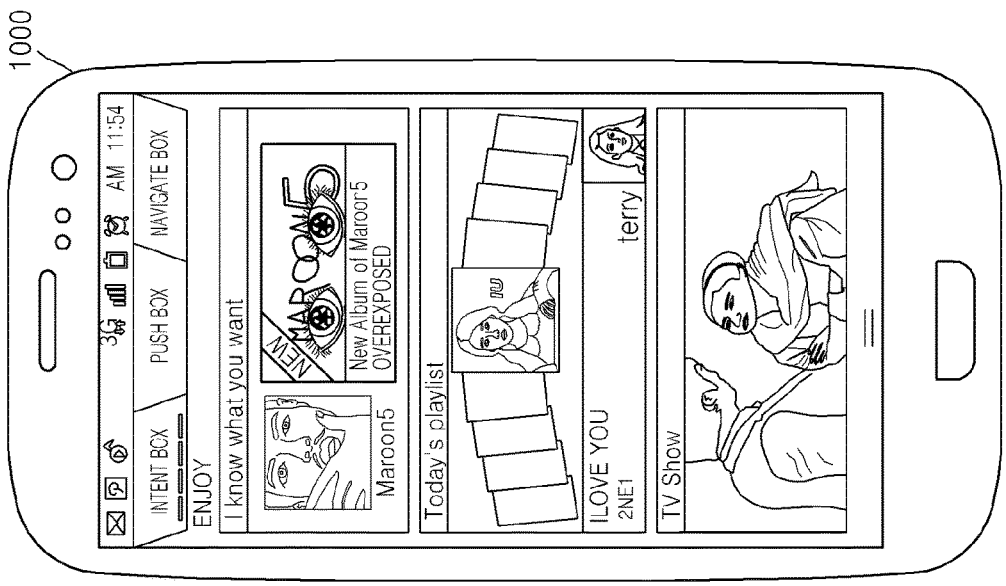
FIGS. 16A and 16B illustrate an example in which an object via which a service is used is displayed on a device, according to another exemplary embodiment.
Figure 16B:
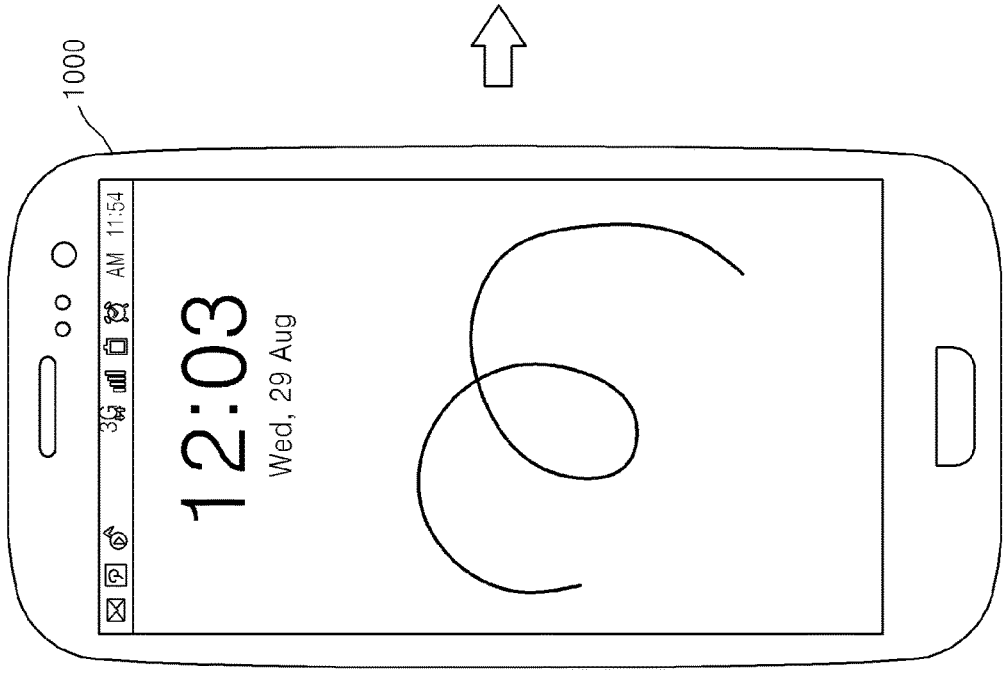

FIGS. 16A and 16B illustrate an example where an object via which a service is used is displayed on a device 1000, according to another exemplary embodiment.

Referring to FIG. 16A, a user may input a predetermined pattern on an unlock screen of the device 1000. As a predetermined pattern is successfully input to the unlock screen, an object via which a service is used may be displayed on a screen of the device 1000 as illustrated in FIG. 16B. In this case, a pattern input for displaying an object may be different from a pattern input for unlocking the device 1000.

Figure 17A:
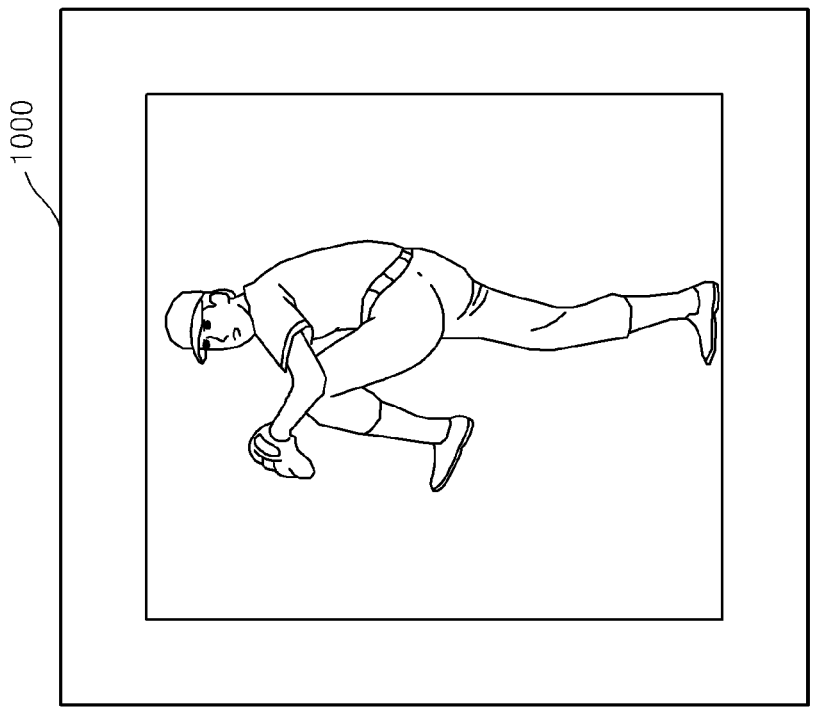
FIGS. 17A and 17B are diagrams illustrating an object via which a picture sharing service is used, according to an exemplary embodiment.
Figure 17B:
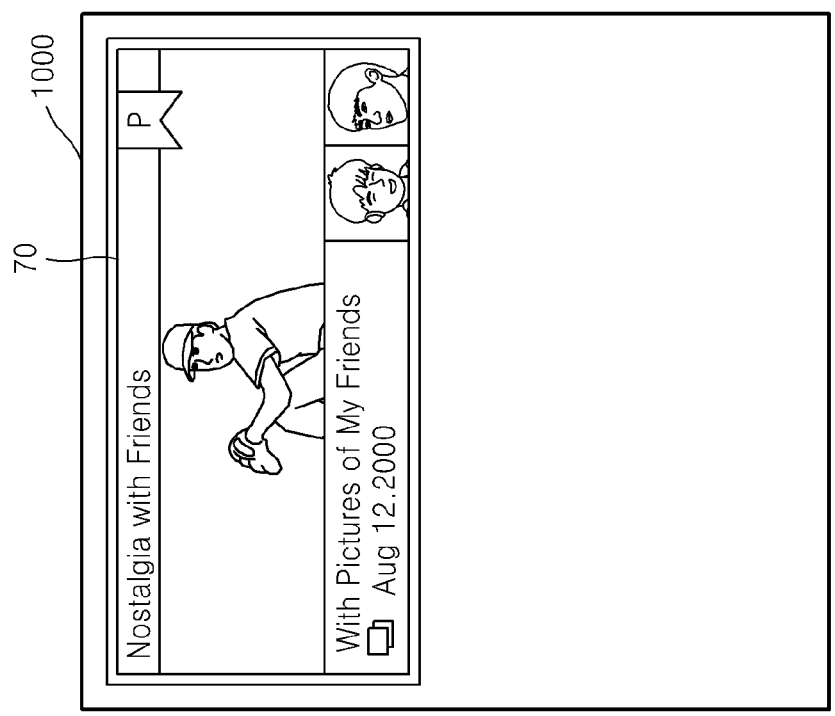

FIGS. 17A and 17B are diagrams illustrating an object via which a picture sharing service is used, according to an exemplary embodiment.

The device 1000 may collect information about at least another device (not shown) near the device 1000 as context information, and may provide the server 2000 with an identification value of another device (not shown) collected as the context information.

Accordingly, the server 2000 may provide the device 1000 with an object 70 for displaying a picture that is taken by the user of the device 1000 with other users of other devices 1000. Also, as illustrated in FIG. 17A, an object 70 for displaying a picture taken by the user of the device 1000 with users of the other devices 1000 may be displayed on a screen of the device 1000.

Also, when the user touches the object 70, as illustrated in FIG. 17B, a picture taken by the user of the device 1000 with users of the other devices 1000 may be displayed on the screen of the device 1000.

Figure 18A:
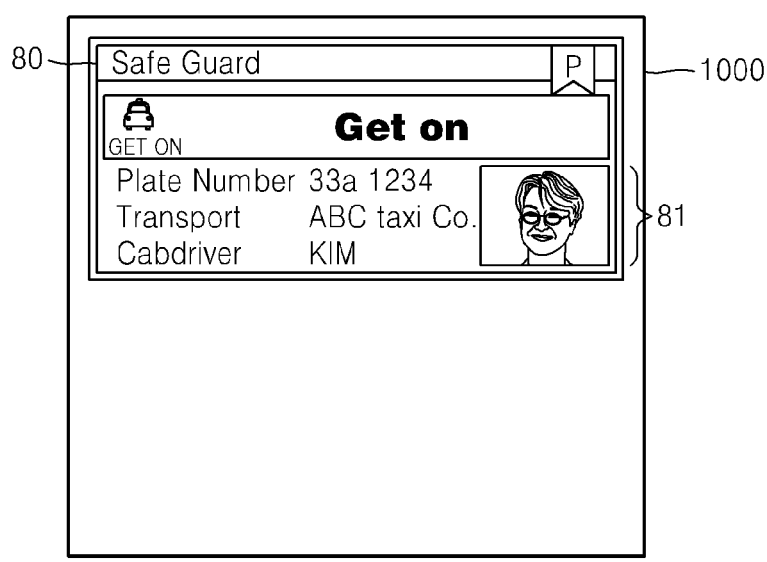
FIGS. 18A, 18B, and 18C are diagrams illustrating an object via which a personal safety service is used, according to an exemplary embodiment.
Figure 18B:
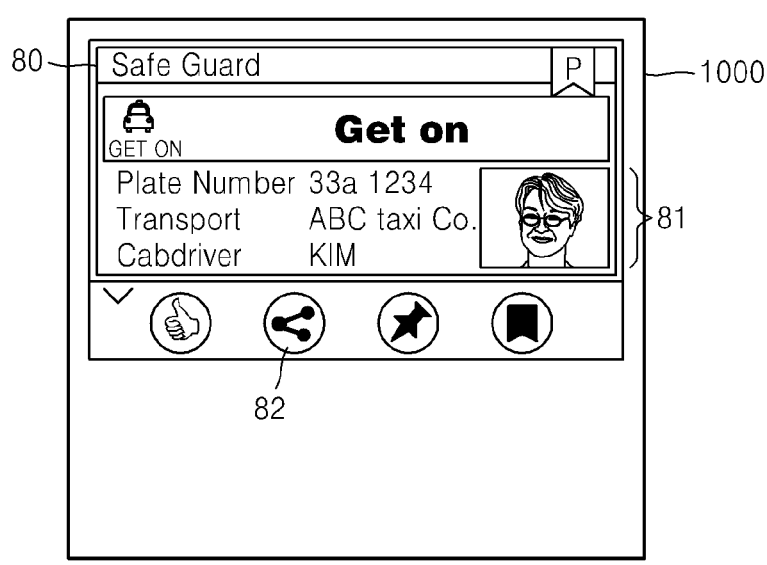
Figure 18C:
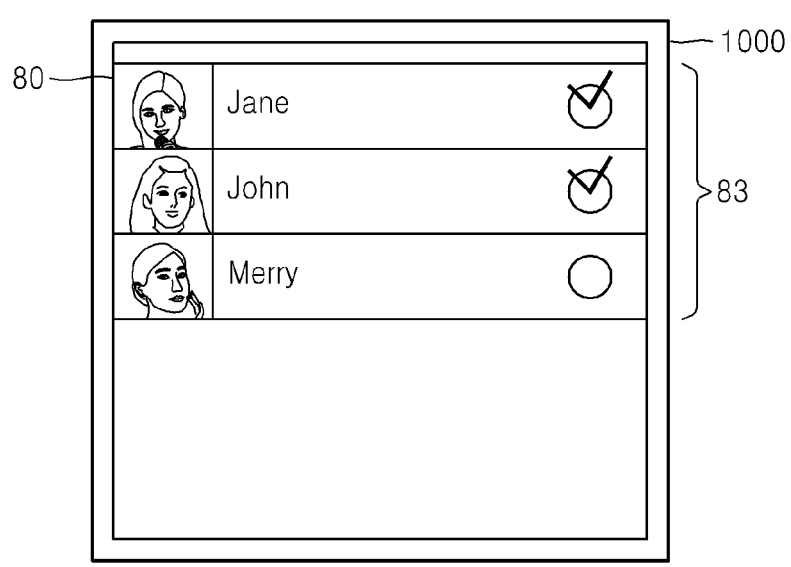

FIGS. 18A, 18B, and 18C are diagrams illustrating an object via which a personal safety service is used, according to an exemplary embodiment.

When a user of the device 1000 gets in a taxi, the server 2000 may provide the device 1000 with an object 80 of a personal safety service, as illustrated in FIG. 18A. Also, information 81 about the taxi that the user of the device 1000 has taken may be displayed on the object 80. The information 81 about the taxi may include, for example, information about a plate number, a company, and a driver of the taxi.

Also, when the user touches the object 80, as illustrated in FIG. 18B, icons for selecting services provided via the object 80 may be displayed. Also, when the user selects an icon 82 from among the displayed icons, menus for selecting an object that is to receive the information 81 about the taxi that the user of the device 1000 has taken may be displayed as illustrated in FIG. 18C.

Also, when the user selects "Jane" and "John," the information 81 about the taxi may be provided to a device of "Jane" (not shown) and a device of "John" (not shown). The information 81 about the taxi may be transmitted from the device 1000 to the device of "Jane" and the device of "John," but is not limited thereto. The information 81 about the taxi may be transmitted by the device 1000 to the device (not shown) of "Jane" or the device (not shown) of "John," but is not limited thereto. The information 81 about the taxi may be transmitted to the device (not shown) of "Jane" or the device (not shown) of "John" by at least one of the service provider 3000 and the server 2000.

Figure 19A:
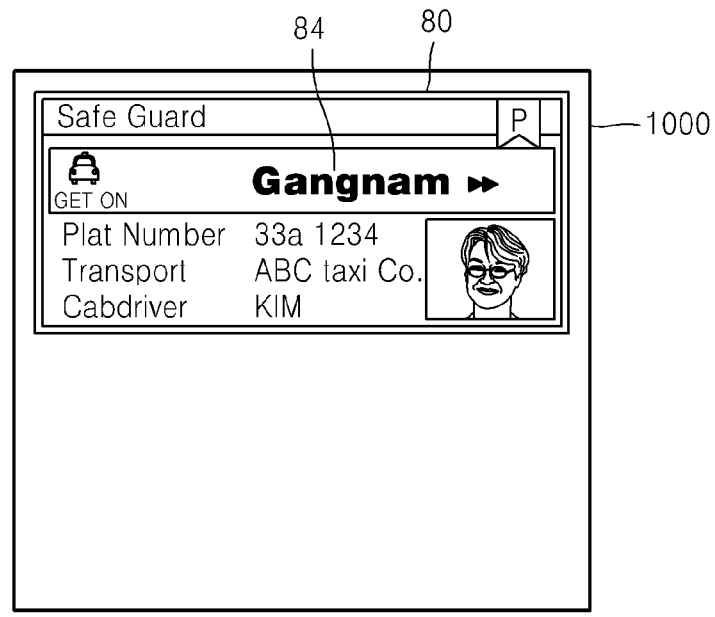
FIGS. 19A and 19B are diagrams illustrating an example where a current location and advertisement are displayed on an object via which a personal safety service is used, according to an exemplary embodiment.
Figure 19B:
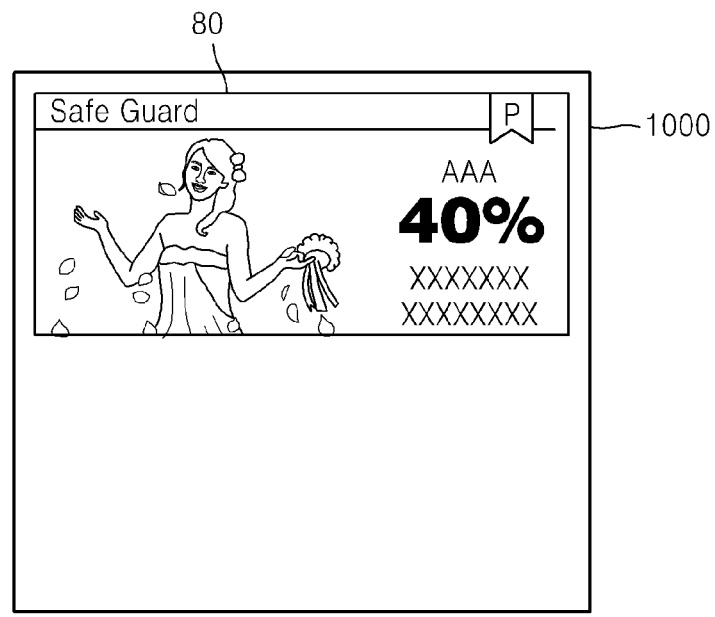

FIGS. 19A and 19B are diagrams illustrating an example where a current location and advertisement are displayed on an object via which a personal safety service is used, according to an exemplary embodiment.

Referring to FIG. 19A, as a taxi that the user of the device 1000 has taken moves, information 84 about a current location of the device 1000 may be displayed on an object 80.

Also, referring to FIG. 19B, an advertisement about a shop located near the current location of the device 1000 may be displayed on the object 80.

Figure 20A:
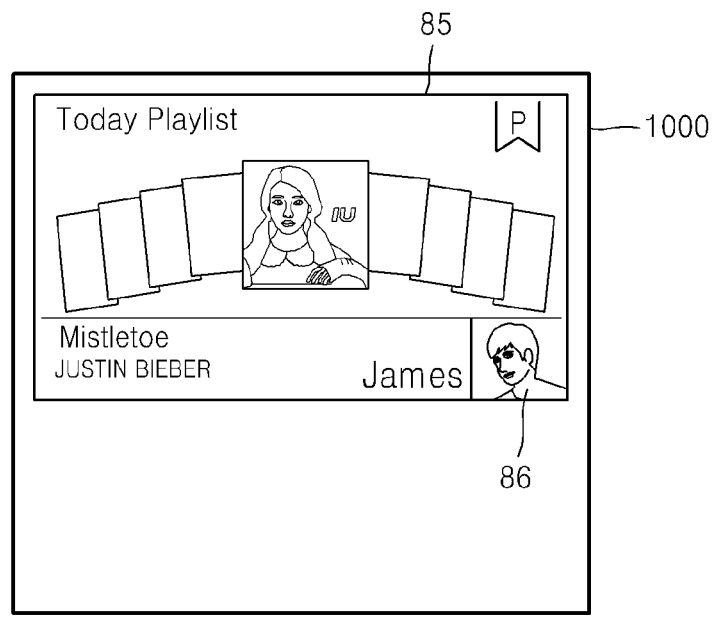
FIGS. 20A, 20B, 21A, and 21B are diagrams illustrating an object via which a music sharing service is used, according to an exemplary embodiment.
Figure 20B:
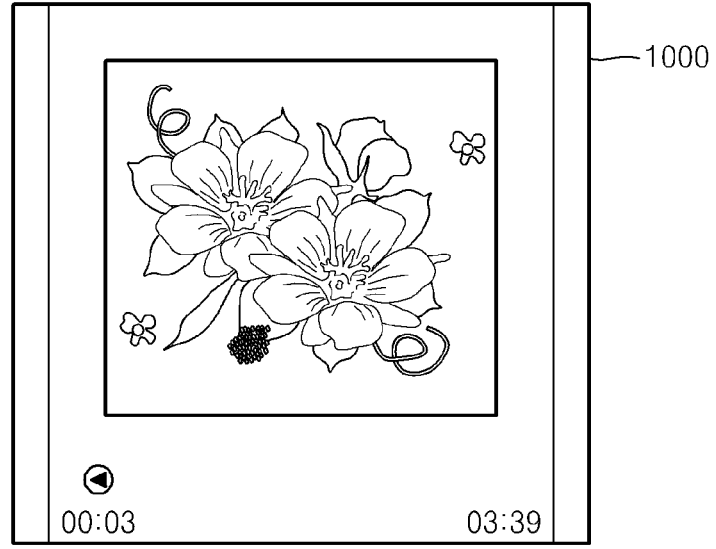
Figure 21B:
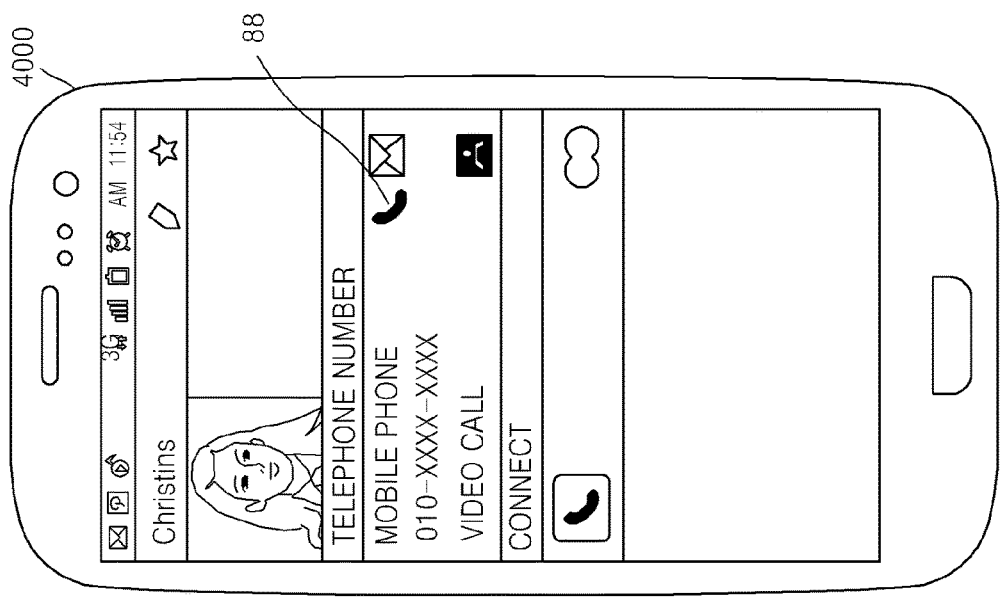
Figure 21A:
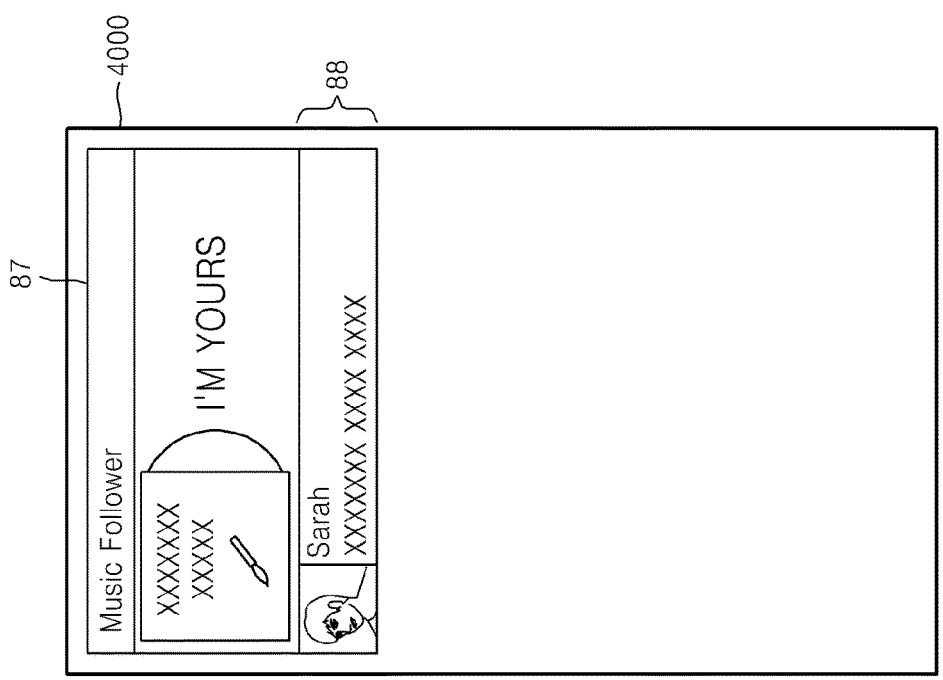

FIGS. 20A, 20B, 21A, and 21B are diagrams illustrating an object via which a music sharing service is used, according to an exemplary embodiment. FIGS. 20A and 20B illustrate a screen of the device 1000 that provides music, and FIGS. 21A and 21B illustrate a screen of a device 4000 that receives music.

Referring to FIG. 20A, the server 2000 may provide the device 1000 with an object 85 that provides a list of songs that a user of the device 1000 has listened to today. An icon for identifying predetermined song (e.g., an album cover) may be displayed on the object 85, and an image 86 of a friend of the user of the device 1000 may be displayed.

Also, when a user selects a predetermined icon, a song corresponding to the selected icon may be replayed on the device 1000, as illustrated in FIG. 20B. Also, as the user selects the image 86, a song being replayed on the device 1000 may be transmitted to a device 4000 of a friend corresponding to the selected image 86.

Also, referring to FIG. 21A, an object 87 for receiving and replaying shared music may be displayed on the screen of the device 4000 of the friend corresponding to the selected image 86 may be displayed. Also, the object 87 may include an area 88 on which information about a friend who has provided music is displayed.

Also, when the area 88 of the object 87 is touched on the device 4000, a user interface via which a phone call with the device 1000 of the friend who has provided music may be made may be displayed on a screen of the device 4000, as illustrated in FIG. 21B. Also, when a phone call icon 88 is selected, the device 4000 may call the device 1000.

Figure 22A:
FIGS. 22A, 22B, and 22C illustrate second templates according to exemplary embodiments.
Figure 22B:
Figure 22C:
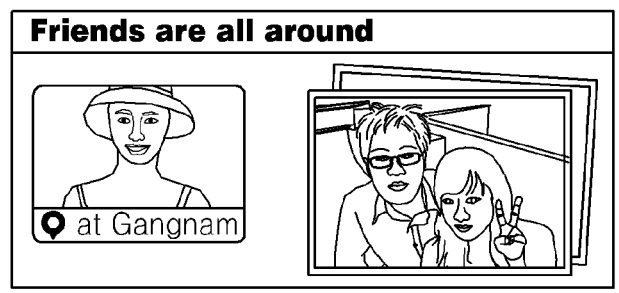

FIGS. 22A, 22B, and 22C illustrate second templates according to exemplary embodiments. The second template illustrated in FIG. 22A may provide a music recommendation service. Also, the second template illustrated in FIG. 22B may provide a service that displays an image that was taken a year ago. Also, the second template illustrated in FIG. 22C may provide a service that displays information about friends who are present near a current location and pictures that were taken near a current location of the device 1000.

The second templates illustrated in FIGS. 22A, 22B, and 22C may be edited by at least one service provider 3000. Also, at least one of the second templates may be included in an object.

Figure 23:
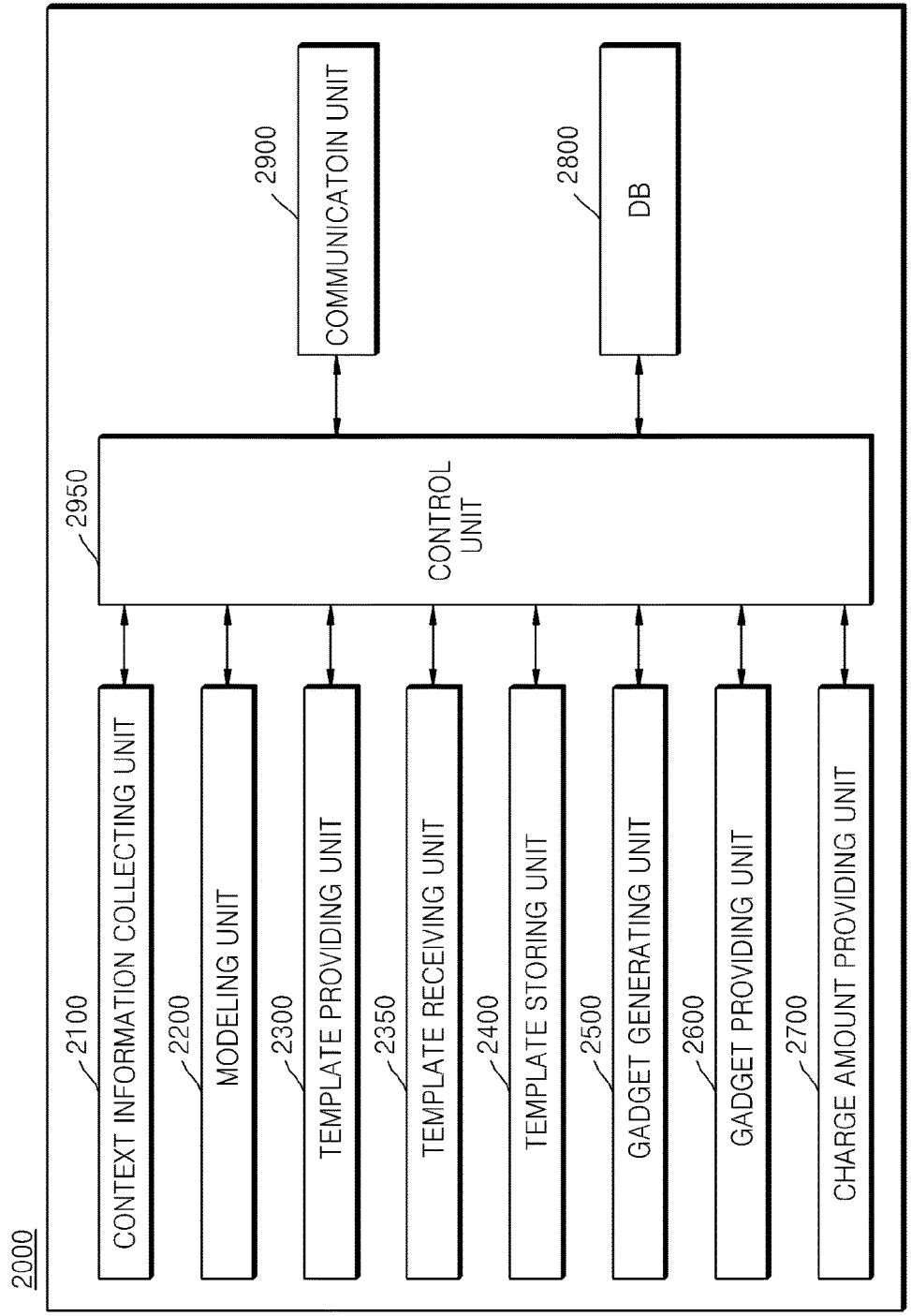
FIG. 23 is a block diagram of a server according to an exemplary embodiment.

FIG. 23 is a block diagram of a server 2000 according to an exemplary embodiment.

Referring to FIG. 23, the server 2000 includes a context information collecting unit 2100, a modeling unit 2200, a template providing unit 2300, a template receiving unit 2350, a template storing unit 2400, an object generating unit 2500, an object providing unit 2600, a charge amount determining unit 2700, a DB 2800, a communication unit 2900, and a control unit 2950.

The context information collecting unit 2100 collects context information from at least one device 1000. The context information collecting unit 2100 may collect context information to generate a context model. Also, the context information collecting unit 2100 may receive context information to determine a current situation of the device 1000.

Context information refers to information about a situation in which the device 1000 has used a service. The device 1000 may use various types of services under various situations, and context information regarding a service use situation may be collected by the context information collecting unit 2100. Also, a context item refers to a specific item included in context information, and may include, for example, a user who has used a service, a type of a device that has used a service, a service use time, a service use location, other users who have also used a service, and an application executed on a device, but is not limited thereto.

The modeling unit 2200 generates a context model by modeling context information. The modeling unit 2200 may model context information by recommending a context item for each service type and matching the recommended context item with a service type. The modeling unit 2200 may recommend, with respect to a predetermined service, at least one of a user who has used a service, a type of a device that has used a service, a service use time, a service use location, other users who have also used a service, and an application executed on a device. For example, if a housewife frequently watches morning dramas on TV on weekday mornings, the modeling unit 2200 may recommend a context item such as 'weekday morning,' 'housewife,' and 'TV' with respect to a 'morning drama broadcast service.'

Also, the modeling unit 2200 may generate a context model by matching a service type with the recommended context item. For example, the modeling unit 2200 may generate a context model by matching a 'morning drama broadcast service' with 'weekday morning,' 'housewife,' and 'TV.' The context model may be used in determining which context item to match with a service of the service provider 3000.

Also, the modeling unit 2200 may provide the service provider 3000 with context information and the generated context model.

The template providing unit 2300 provides the service provider 3000 with a first template that is used in generating an object via which a service is used. The template providing unit 2300 may provide the service provider 3000 with the first template via the communication unit 2900. The first template may include a plurality of areas, and may include, for example, an area for inserting a description of a service, an area for inserting an image related to a service, an area for inserting a menu and an icon via which a service is used, but is not limited thereto. Also, the server 2000 may previously determine a structure of a template for generating an object, according to a service type or a context model.

The first template may also be previously determined by a user or according to the device 1000. The template providing unit 2300 may previously determine the first templates to be provided to the device 1000 of the user according to the user's preference, and provide the service provider 3000 with the determined first templates.

Also, the template providing unit 2300 may provide the service provider 3000 with at least one context model. Also, the service provider 3000 may select a predetermined context model from among the provided context models, and may match the selected context model with a service of the service provider 3000. Also, the service provider 3000 may match the selected context model, a service of the service provider 3000, and a second template.

A context model may include a plurality of context items and service types that are matched with the plurality of context items, and the service provider 3000 may select at least one of the plurality of context items and match the selected context item with a second template.

Also, the template providing unit 2300 provides the service provider 3000 with an editing tool. An editing tool may be a tool for editing the first template. An editing tool may be displayed on a display device (not shown) included in the service provider 3000 via a user interface that includes at least one of, for example, an area for selecting a context model, an area for selecting a context item, an area for selecting a service of the service provider 3000, and an area for inserting information about a service of the service provider 3000.

In addition, the template providing unit 2300 may provide the service provider 3000 with a file of an editing tool, but is not limited thereto. The template providing unit 2300 may provide the service provider 3000 with link information for downloading an editing tool. Also, the template providing unit 2300 may receive an editing tool from the service provider 3000 through a web service, and the template providing unit 2300 may edit the first template based on a received editing command.

The template receiving unit 2350 receives the second template generated by the service provider 3000 from the service provider 3000. The template receiving unit 2350 may receive the second template generated using the service provider 3000, from the service provider 3000 via the communication unit 2900.

The template storing unit 2400 stores a template for providing a service of the service provider 3000. The template storing unit 2400 may store the first template that is to be provided to the service provider 3000. Also, the template storing unit 2400 may store the second template generated using the service provider 3000. The second template may be matched with a context item selected by the service provider 3000 and a service of the service provider 3000. Also, the template storing unit 2400 may store the first template and the second template in the DB 2800 as described later.

The object generating unit 2500 generates an object to be provided to the device 1000. The object generating unit 2500 may determine a current situation of the device 1000. The object generating unit 2500 may monitor, for example, a user of the device 1000, a type of the device 1000, a location of the device 1000, a current time, a weekday, and an application being executed on the device 1000, but is not limited thereto.

Also, the object generating unit 2500 may extract at least one second template corresponding to a current situation of the device 1000 from a DB 2800. The object generating unit 2500 may compare the current situation of the device 1000 with a context item included in the second template. Also, the object generating unit 2500 may extract a context item corresponding to the monitored current situation of the device 1000 from the DB 2800. For example, if a housewife has turned on a TV on a weekday morning, the server 2000 may extract the second template that is matched with context items such as 'housewife,' 'weekday morning,' and 'TV,' from the DB 2800.

Also, the object generating unit 2500 may generate an object using the extracted second template. The object generating unit 2500 may insert information about a basis for recommending to the device 1000 the object via which a service of the service provider 3000 is to be provided, into the object. Also, the object generating unit 2500 may generate an object by combining a template received from the service provider 3000 and a template received from at least another service provider (not shown). However, if the service provider 3000 has purchased a context item using an exclusive purchase method, the server 2000 may not include a template of another service provider (not shown) in the object. Also, the object generating unit 2500 may insert information about a reason for providing the object, into the extracted second template.

The object providing unit 2600 provides the device 1000 with an object. The object providing unit 2600 compares a context item purchased by the service provider 3000 and the current situation of the device 1000, and may provide the device 1000 with an object based on a comparison result. If the context item purchased by the service provider 3000 is the same or similar as the current situation of the first device 1000-1, the object providing unit 2600 may provide the first device 1000-1 with an object via which a service of the service provider 3000 is used.

The charge amount determining unit 2700 determines a charge amount with respect to the service provider 3000. The charge amount determining unit 2700 may calculate a charge amount to be charged to the service provider 3000 based on information about a charging method of the service provider 3000, the number of times of providing an object by the service provider 3000, the number of times that an object of the service provider 3000 is executed by the device 1000, the number of times that the device 1000 has used a service using the object of the service provider 3000, and a service charge to the device 1000 which has used the object for use a service of the service provider 3000.

The DB 2800 may obtain a template for providing a service of the service provider 3000, via the server 200, provide the object to the device 1000, and store various information required to calculate a charge amount.

The communication unit 2900 transmits or receives various information, which is required for the server 2000 to obtain a template for providing a service of the service provider 3000, to generate an object, and provide the object to the device 1000, and calculate a charge amount, to or from the service provider 3000 and the device 1000.

The control unit 2950 controls the context information collecting unit 2100, the modeling unit 2200, the template providing unit 2300, the template storing unit 2400, the object generating unit 2500, the object providing unit 2600, the charge amount determining unit 2700, the DB 2800, and the communication unit 2900 such that the server 2000 may obtain a template for providing a service of the service provider 3000, generate a template, provide the object to the device 1000, and calculate a charge amount.

Figure 24:
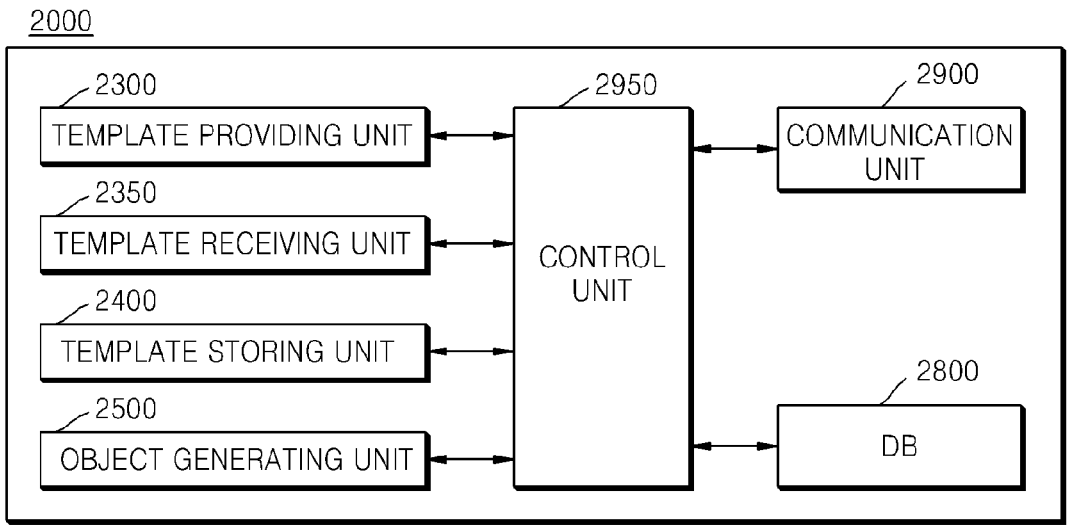
FIG. 24 is a block diagram of a device according to an exemplary embodiment.

FIG. 24 is a block diagram of the server 2000 according to another exemplary embodiment.

Referring to FIG. 24, the server 2000 according to the current exemplary embodiment includes a template providing unit 2300, a template receiving unit 2350, a template storing unit 2400, an object generating unit 2500, a DB 2800, a communication unit 2900, and a control unit 2950.

The template providing unit 2300 provides the service provider 3000 with a first template that is used in generating an object via which a service is used. The template providing unit 2300 may provide the service provider 3000 with a first template via the communication unit 2900. The first template may include a plurality of areas such as an area for inserting a description of a service, an area for inserting an image related to a service, and an area for inserting a menu and an icon via which a service is used, but is not limited thereto. Also, the server 2000 may previously determine a structure of a template for generating an object, according to a service type or a context model.

Also, the first template may be previously determined according to a user or the device 1000. The template providing unit 2300 may previously determine templates to be provided to the device 1000 of the user according to the user's preference, and provide the determined first templates to the service provider 3000.

Also, the template providing unit 2300 may provide the service provider 3000 with at least one context model. Also, the service provider 3000 may select a predetermined context model from among the provided context models, and may match the selected context model with a service of the service provider 3000. Also, the service provider 3000 may match the selected context model, a service of the service provider 3000, and a second template.

A context model may include a plurality of context items and service types matched with the plurality of context items, and the service provider 3000 may select at least one of the plurality of context items and match the selected context item with a second template.

Also, the template providing unit 2300 provides the service provider 3000 with an editing tool. An editing tool may be a tool for editing a first template. An editing tool may be displayed on a display device (not shown) included in the service provider 3000 via a user interface including at least one of, for example, an area for selecting a context model, an area for selecting a context item, an area for selecting a service of the service provider 3000, and an area for inserting information about a service of the service provider 3000.

Also, the template providing unit 2300 may provide the service provider 3000 with a file of an editing tool, but is not limited thereto. The template providing unit 2300 may provide the service provider 3000 with link information for downloading an editing tool. Also, the template providing unit 2300 may receive an editing command from the service provider 3000 via a web service, and may edit the first template based on a received editing command.

The template receiving unit 2350 receives a second template generated using the service provider 3000, from the service provider 3000. The template receiving unit 2350 may receive a second template generated using the service provider 3000, from the service provider 3000, via the communication unit 2900.

The template storing unit 2400 stores a template for providing a service of the service provider 3000. The template storing unit 2400 may store the first template to be provided to the service provider 3000. Also, the template storing unit 2400 may store a second template generated using the service provider 3000. The second template may be matched with a context item selected by the service provider 3000 and a service of the service provider 3000. Also, the template storing unit 2400 may store the first template and the second template in the DB 2800 as described later.

The object generating unit 2500 generates an object to be provided to the device 1000. The object generating unit 2500 may determine a current situation of the device 1000. The object generating unit 2500 may monitor, for example, a user of the device 1000, a type of the device 1000, a location of the device 1000, a current time, a weekday, and an application being executed on the device 1000, but is not limited thereto.

Also, the object generating unit 2500 may extract at least one second template corresponding to the current situation of the device 1000 from a DB 2800. The object generating unit 2500 may compare the current situation of the device 1000 with a context item included in the second template. Also, the object generating unit 2500 may extract the second template including the context item corresponding to the monitored current situation of the device 1000, from the DB 2800. For example, if a housewife has turned on a TV on a weekday morning, the server 2000 may extract the second template matched with context items such as 'housewife,' 'weekday morning,' and 'TV,' from the DB 2800.

Also, the object generating unit 2500 may generate an object using the extracted second template. The object generating unit 2500 may insert information about a basis for recommending to the device 1000 an object for providing a service of the service provider 3000, into the object. Also, the object generating unit 2500 may generate an object by combining a template received from the service provider 3000 and a template received from at least another service provider (not shown). However, if the service provider 3000 has purchased a context item using an exclusive purchase method, the server 2000 may not include a template of another service provider (not shown) in the object. Also, the object generating unit 2500 may insert information about a basis for recommending the object, into the extracted second template.

The DB 2800 stores various information that is required for the server 2000 to obtain a template for providing a service of the service provider 3000 and generate an object.

The communication unit 2900 transmits or receives various information, which is required for the server 2000 to obtain a template for providing a service of the service provider 3000 and to generate an object, to or from the service provider 3000 and the device 1000.

The control unit 2950 controls the template providing unit 2300, the template storing unit 2400, the object generating unit 2500, the DB 2800, and the communication unit 2900 such that the server 2000 may obtain a template for providing a service of the service provider 3000 and generate an object.

Figure 25:
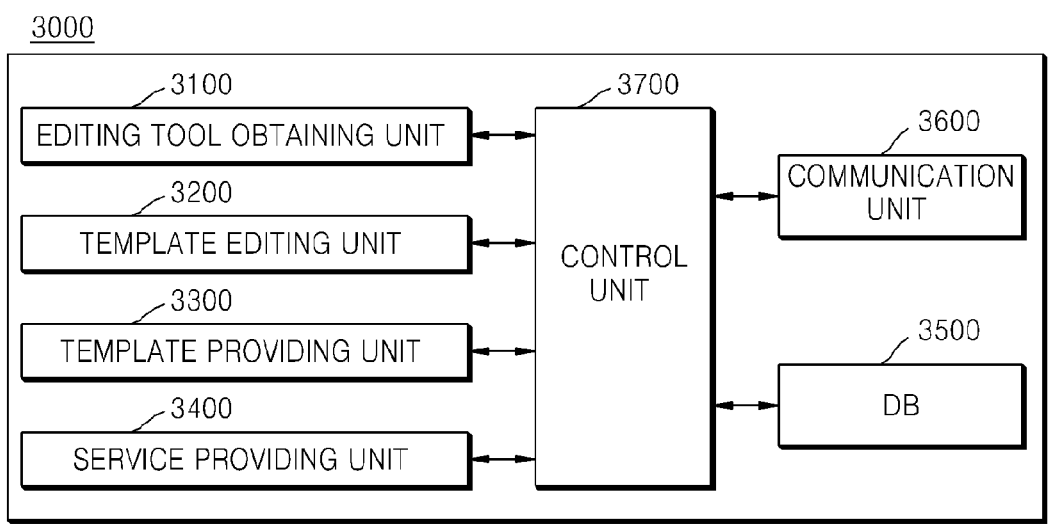
FIG. 25 is a block diagram of a service provider according to an exemplary embodiment.

FIG. 25 is a block diagram of a service provider 3000 according to an exemplary embodiment.

The service provider 3000 includes an editing tool obtaining unit 3100, a template editing unit 3200, a template providing unit 3300, a service providing unit 3400, a DB 3500, a communication unit 3600, and a control unit 3700.

The editing tool obtaining unit 3100 obtains an editing tool for editing a first template. The editing tool obtaining unit 3100 may receive an editing tool from the server 2000. Also, the editing tool obtaining unit 3100 may receive link information via which an editing tool may be downloaded, and may download an editing tool using the received link information. Also, the editing tool obtaining unit 3100 may use an editing tool by accessing a predetermined web server on the Web.

An editing tool may be displayed on a display device (not shown) included in the service provider 3000 via a user interface including at least one of, for example, an area for selecting a context model, an area for selecting a context item, an area for selecting a service of the service provider 3000, and an area for inserting information about a service of the service provider 3000.

The template editing unit 3200 obtains a first template from the server 2000 and edits the first template. Also, the template editing unit 3200 may generate a second template by editing the first template. Also, as a predetermined context model is selected using an editing tool, the template editing tool 3200 may obtain the first template regarding the selected context model. Also, based on a user input made via an editing tool, the template editing unit 3200 may select a context item and a service of the service provider 3000. Also, based on a user input made via an editing tool, the template editing tool 3200 may insert service information about a service of the service provider 3000 into the first template.

The template providing unit 3300 provides the server 2000 with the second template. The template providing unit 3300 may request the server 2000 to purchase a context item matched with the second template while providing the second template to the server 2000. Also, the template providing unit 3300 may provide the server 2000 with information about a charging method and a purchase cost.

The service providing unit 3400 provides the device 1000 with a service of the service provider 3000. The device 1000 may request the service provider 3000 for a service via an object received from the server 2000, and the service providing unit 3400 may provide the device 1000 with the requested service.

The DB 3500 stores various information that is required for the service provider 3000 to edit the first template and provide a service to the device 1000.

The communication unit 3600 transmits or receives various information, which is required for the service provider 3000 to edit the first template and provide a service to the device 1000, to or from the server 2000 and the device 1000.

The control unit 3700 controls the editing tool obtaining unit 3100, the template editing unit 3200, the template providing unit 3300, the DB 3500, and the communication unit 3600 such that the service provider 3000 may edit the first template and provide a service to the device 1000.

The term "unit" as used herein means a hardware component, such as a processor or circuit, and/or a software component that is executed by a hardware component such as a processor.

An exemplary embodiment may also be realized in a form of a recording medium including commands executable by a computer, such as a program module executed by a computer. A computer-readable recording medium may be an arbitrary available medium accessible by a computer, and may be any one of volatile, nonvolatile, separable, and non-separable media. Also, examples of the computer-readable recording medium may include a computer storage medium and a communication medium. Examples of the computer storage medium include volatile, nonvolatile, separable, and non-separable media realized by an arbitrary method or technology for storing information about a computer-readable command, a data structure, a program module, or other data. The communication medium may include a computer-readable command, a data structure, a program module, other data of a modulated data signal, such as carriers, or other transmission mechanisms, and may be an arbitrary information transmission medium.

While exemplary embodiments have been particularly shown and described, it will be understood by those of ordinary skill in the art that various changes in form and details may be made therein without departing from the spirit and scope of the invention as defined by the appended claims. The exemplary embodiments should be considered in a descriptive sense only and not for purposes of limitation. For example, each element described as a single type may be distributed, and similarly, elements described to be distributed may be combined.

The scope of the inventive concept is defined not by the detailed description but by the appended claims, and all differences within the scope will be construed as being included in the inventive concept.

What is claimed is:

1. A server, comprising a hardware processor, that provides a device with an object via which a service provided by a service provider is used, the service provider being external to the server, the server comprising:
    a template provider, implemented with the hardware processor, configured to provide the service provider with a first template which is used in generating a second template;
    a template receiver, implemented with the hardware processor, configured to receive, from the service provider, the second template that is generated by the service provider by editing the first template;
    a memory, configured to store the received second template by associating the second template with context information corresponding to a current situation of the device;
    an object generator, implemented with the hardware processor, configured to generate, using the stored second template, the object via which the service provided by the service provider is used; and
    an object provider, implemented with the hardware processor, configured to provide the object to the device according to the current situation of the device,
    wherein the current situation of the device comprises a current location of the device that is determined by a global positioning system (GPS),
    wherein the template provider is configured to provide the service provider with at least one context model related to use of the service,
    wherein the at least one context model comprises a package which includes a unique combination of context items representing a situation in which the service is provided, and a service type that is provided based on the unique combination of context items and the current situation of the device,
    wherein the second template matches with a context model selected by the service provider from among the provided at least one context model,
    wherein the context items comprise a time of day and a type of the device, and service types provided by the service provider comprise a broadcast service,
    wherein the template provider is configured to provide the service provider with an editing tool used in editing the first template,
    wherein the editing tool is used by the service provider in editing the first template,
    wherein the editing tool comprises a context application program interface (API), and
    wherein the context API is used by the service provider in loading a context model related to use of the service, from the server.

2. The server of claim 1,
    wherein the second template matches with the service of the service provider.

3. The server of claim 2, wherein the object provider is configured to provide the device with the object including the second template that matches with a context model related to the current situation of the device.

4. The server of claim 1, wherein the object generator is configured to insert information about a reason why the object is provided, into the second template.

5. The server of claim 1, wherein at least one of the context items, selected by the service provider, is matched with the second template by the service provider.

6. The server of claim 1 wherein the editing tool is used by the service provider in inserting information about the service of the service provider into the first template.

7. The server of claim 1 wherein the editing tool is used by the service provider in selecting a context item and a service that are to be matched with the second template.

8. The server of claim 1, wherein the editing tool is displayed on a display of the service provider via a user interface including an area for selecting a context item, an area for selecting the service, and an area for inserting information about the service.

9. The server of claim 1, wherein the editing tool comprises a service application program interface (API),
wherein the service API is used by the service provider in loading information about a service of the service provider.

10. The server of claim 1, wherein the object comprises a user interface comprising an icon, text, an image, and link information of content provided through the service, and description information about a function of the object.

11. A method of providing an object via which a service provided by a service provider is used by a server that is external to the service provider, to at least one device, wherein the method is performed by the server, the method comprising:
providing, to the service provider, a first template which is used in generating a second template;
receiving, from the service provider, the second template that is generated by the service provider by editing the first template;
generating an object via which a service of the service provider is used, using the received second template;
providing the object to the at least one device according to a current situation of the at least one device; and
providing the service provider with an editing tool used in editing the first template,
wherein the current situation of the at least one device comprises a current location of the at least one device that is determined by a global positioning system (GPS),
wherein the providing the first template comprises providing the service provider with at least one context model related to use of the service,
wherein the at least one context model comprises a package which includes a unique combination of context items representing a situation in which the service is provided, and a service type that is provided based on the unique combination of context items and the current situation of the device,
wherein the second template matches with a context model selected by the service provider from among the provided at least one context model,
wherein the context items comprise a time of day and a type of the device, and service types provided by the service provider comprise a broadcast service,
wherein the editing tool is used by the service provider in editing the first template,
wherein the editing tool comprises a context application program interface (API), and wherein the context API is used by the service provider in loading a context model related to use of the service, from the server.

12. The method of claim 11,
wherein the second template matches with the service of the service provider.

13. The method of claim 12, wherein in the providing the object, the at least one device is provided with the object including the second template that matches with a context model related to the current situation of the at least one device.

14. The method of claim 11, wherein in the generating the object, information about a reason why the object is provided is inserted into the second template.

15. The method of claim 11, wherein at least one of the context items, selected by the service provider, is matched with the second template by the service provider.

16. The method of claim 11, wherein the editing tool is used by the service provider in inserting information about the service of the service provider into the first template.

17. The method of claim 11, wherein the editing tool is used by the service provider in selecting a context item and a service that are to be matched with the second template.

18. The method of claim 11, wherein the object comprises a user interface comprising an icon, text, an image, and link information of content provided through the service, and description information about a function of the object.

19. A method of providing, to a server, a template used by a service provider in generating an object for providing a service of the service provider, which is external to the server, the method comprising:
receiving, from the server, a first template which is used in generating a second template;
generating the second template by editing the first template; and
providing the server with the generated second template;
providing the object to a device according to a current situation of the device; and
providing the service provider with an editing tool used in editing the first template,
wherein the current situation of the device comprises a location of the device that is determined by a global positioning system (GPS), and
wherein the second template is used by the server in generating the object,
wherein the receiving the first template comprises receiving at least one context model related to use of the service,
wherein the at least one context model comprises a package which includes a unique combination of context items representing a situation in which the service is provided, and a service type that is provided based on the unique combination of context items and the current situation of the device,
wherein the second template matches with a context model selected by the service provider from among the at least one context model,
wherein the context items comprise a time of day and a type of the device, and service types provided by the service provider comprise a broadcast service,
wherein the editing tool is used by the service provider in editing the first template,
wherein the editing tool comprises a context application program interface (API), and
wherein the context API is used by the service provider in loading a context model related to use of the service, from the server.

20. The method of claim 19, wherein the second template is matched with a service of the service provider.

21. The method of claim 20, further comprising receiving, from the server, an editing tool for editing the first template, wherein in the generating the second template, the first template is edited using the editing tool.

22. The method of claim 21, wherein in the generating the second template, the context item is matched with the second template using the editing tool.

23. The method of claim 21, wherein in the generating the second template, a service of the service provider is matched with the second template using the editing tool.

24. The method of claim 21, wherein in the generating the second template, service information about the service provider is inserted into the first template using the editing tool.

25. A non-transitory computer-readable medium storing a program causing a computer to execute a method of providing an object via which a service provided by a service provider is used by a server that is external to the service provider, to at least one device, wherein the method is performed by the server, the method comprising:
  providing, to the service provider, a first template which is used in generating a second template;
  receiving, from the service provider, the second template that is generated by the service provider by editing the first template;
  generating an object via which a service of the service provider is used, using the received second template;
  providing the object to the at least one device according to a current situation of the at least one device; and
  providing the service provider with an editing tool used in editing the first template,
  wherein the current situation of the at least one device comprises a current location of the at least one device that is determined by a global positioning system (GPS),
  wherein the providing the first template comprises providing the service provider with at least one context model related to use of the service,
  wherein the at least one context model comprises a package which includes a unique combination of context items representing a situation in which the service is provided, and a service type that is provided based on the unique combination of context items and the current situation of the device,
  wherein the second template matches with a context model selected by the service provider from among the provided at least one context model, and
  wherein the context items comprise a time of day and a type of the device, and service types provided by the service provider comprise a broadcast service,
  wherein the editing tool is used by the service provider in editing the first template,
  wherein the editing tool comprises a context application program interface (API), and
  wherein the context API is used by the service provider in loading a context model related to use of the service, from the server.

26. A non-transitory computer-readable medium storing a program causing a computer to execute a method of providing, to a server, a template used by a service provider, which is external to the server, in generating an object for providing a service of the service provider, the method comprising:
  receiving, from the server, a first template which is used in generating a second template;
  generating the second template by editing the first template;
  providing the server with the generated second template; and
  providing the object to a device according to a current situation of the device; and
  providing the service provider with an editing tool used in editing the first template,
  wherein the current situation of the device comprises a current location of the device that is determined by a global positioning system (GPS),
  wherein the second template is used by the server in generating the object,
  wherein the receiving the first template comprises receiving at least one context model related to use of the service,
  wherein the at least one context model comprises a package which includes a unique combination of context items representing a situation in which the service is provided, and a service type that is provided based on the unique combination of context items and the current situation of the device,
  wherein the second template matches with a context model selected by the service provider from among the at least one context model, and
  wherein the context items comprise a time of day and a type of the device, and service types provided by the service provider comprise a broadcast service,
  wherein the editing tool is used by the service provider in editing the first template,
  wherein the editing tool comprises a context application program interface (API), and
  wherein the context API is used by the service provider in loading a context model related to use of the service, from the server.

27. The server of claim 1, wherein the object provided to the device displays information about a friend that is within a predetermined distance of the current location of the device determined by the GPS.

28. The server of claim 1, wherein the object provided to the device displays a picture that was taken within a predetermined distance of the current location of the device determined by the GPS.

* * * * *